US012304157B2

(12) United States Patent
Clothier et al.

(10) Patent No.: US 12,304,157 B2
(45) Date of Patent: May 20, 2025

(54) IN-SITU MONITORING AND CONTROL OF INDUCTION WELDING OF THERMOPLASTIC COMPOSITES USING AMORPHOUS OR NANOCRYSTALLINE MICROWIRE TEMPERATURE SENSORS AND SELF-CENTERING ANTENNAE RAIL SYSTEM

(71) Applicant: TSI Technologies LLC, Wichita, KS (US)

(72) Inventors: Brian Lee Clothier, Wichita, KS (US); Michael J. Bourke, III, Brighton, MI (US); Vladimir Malyshev, Moscow Region (RU)

(73) Assignee: TSI Technologies LLC, Wichita, KS (US)

( * ) Notice: Subject to any disclaimer, the term of this patent is extended or adjusted under 35 U.S.C. 154(b) by 198 days.

(21) Appl. No.: 18/047,908

(22) Filed: Oct. 19, 2022

(65) Prior Publication Data
US 2023/0117692 A1   Apr. 20, 2023

Related U.S. Application Data

(60) Provisional application No. 63/360,674, filed on Oct. 20, 2021.

(51) Int. Cl.
*B29C 65/00* (2006.01)

(52) U.S. Cl.
CPC .... *B29C 66/91216* (2013.01); *B29C 66/7392* (2013.01); *B29C 66/91221* (2013.01)

(58) Field of Classification Search
CPC ........ B29C 66/91216; B29C 66/91221; B29C 66/7392; H04N 19/186; H04N 19/176; H04N 19/436
USPC ....................................................... 156/378
See application file for complete search history.

(56) References Cited

U.S. PATENT DOCUMENTS

| 4,203,544 | A  | 5/1980 | Guilgue |
| 5,729,291 | A  | 3/1998 | Tanaka et al. |
| 7,794,142 | B2 | 9/2010 | Clothier et al. |
| 8,192,080 | B2 | 6/2012 | Clothier |
| 8,251,581 | B2 | 8/2012 | Clothier et al. |
| 8,258,441 | B2 | 9/2012 | Clothier |
| 9,126,170 | B2 | 9/2015 | Clothier |

(Continued)

OTHER PUBLICATIONS

Antonenco et al.; Annealing induced evolution of structure and high frequency magnetic properties in nanocrystalline glass-coated microwires; published in Materials Science and Engineering A 304-306 in 2001, pp. 975 to 978.

*Primary Examiner* — James D Sells
(74) *Attorney, Agent, or Firm* — Hovey Williams LLP

(57) ABSTRACT

A thermoplastic composite welding microwire temperature measurement system broadly comprises a plurality of moveable antennae configured to transmit interrogation signals, a rail system including a motorized linear stage configured to move the antennae along a weld line, and a reader or processor configured to determine a position of the microwire temperature sensor and determine a welding temperature based on response signals of the sensor. The interrogation signal corresponds to two different maximum ramp current amplitudes to create two re-magnetization pulses non-overlapping in the time domain.

17 Claims, 21 Drawing Sheets

(56) References Cited

U.S. PATENT DOCUMENTS 9,212,955 B2     12/2015   Clothier
10,687,071 B2 *   6/2020   Xu ........................ H04N 19/186

* cited by examiner

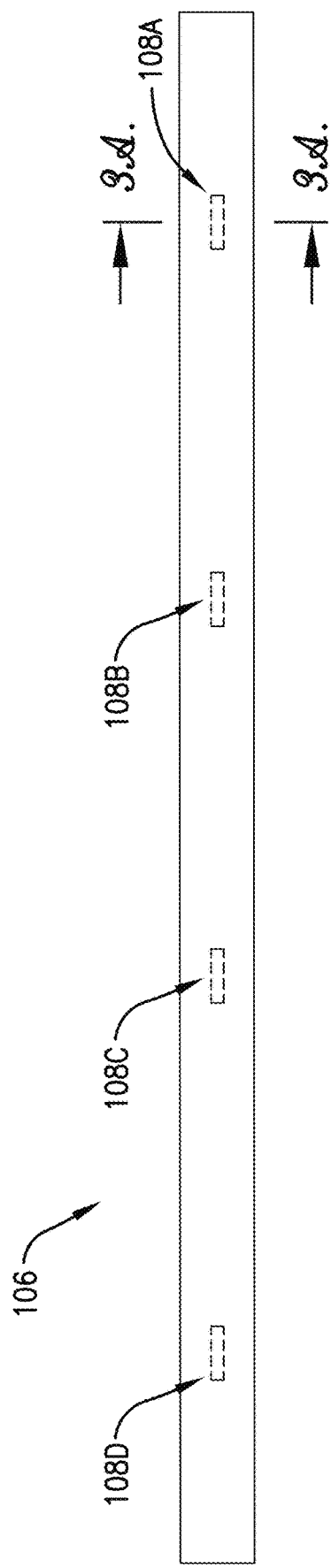
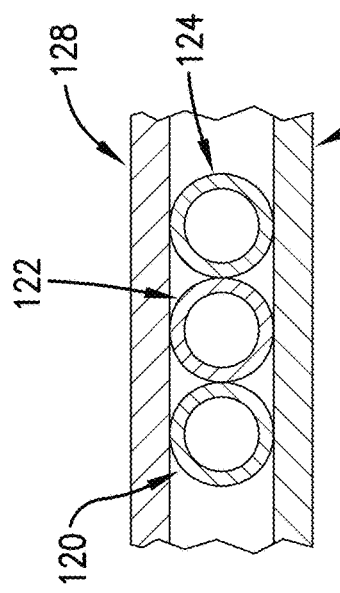
Fig. 3.
Fig. 3A.

IN-SITU MONITORING AND CONTROL OF INDUCTION WELDING OF THERMOPLASTIC COMPOSITES USING AMORPHOUS OR NANOCRYSTALLINE MICROWIRE TEMPERATURE SENSORS AND SELF-CENTERING ANTENNAE RAIL SYSTEM

RELATED APPLICATIONS

The present patent application is a regular utility non-provisional patent application claiming priority benefit, with regard to all common subject matter, to U.S. Provisional Pat. App. Ser. No. 63/360,674, entitled "IN-SITU MONITORING AND CONTROL OF INDUCTION WELDING OF THERMOPLASTIC COMPOSITES USING AMORPHOUS OR NANOCRYSTALLINE MICROWIRE TEMPERATURE SENSORS AND SELF-CENTERING ANTENNAE RAIL SYSTEM", filed Oct. 20, 2021. The earlier-filed patent application is hereby incorporated by reference in its entirety into the present application.

BACKGROUND

Thermoplastic composite welding systems are often used to join two or more composite layers together, wherein weld quality is dependent on welding temperature. To that end, interrogable sensors can be embedded between the composite layers, but current thermoplastic composite welding microwire temperature measurement systems obtain poor welding temperature readings during welding operations and can be difficult to use, among other disadvantages.

SUMMARY

An embodiment of the present invention is a microwire temperature measurement system configured to determine a temperature via a microwire temperature sensor. The microwire temperature measurement system broadly comprises a reader, an antenna, and a microwire temperature sensor. It should be noted that, although a reader may include an antenna in the same enclosure, this disclosure discusses an antenna as a separable, non-self-powered item from its associated reader.

The reader is configured to transmit an AC current (i.e., an instigation signal) through the associated antenna so that the antenna generates an interrogation signal such that the microwire temperature sensor generates a response signal when the antenna is near the microwire temperature sensor. The AC current (i.e., an instigation signal) that causes the antenna to generate the interrogation signal of a constant frequency includes a first maximum ramp amplitude and a second maximum ramp amplitude greater than the first maximum ramp amplitude so that the response signal includes a first re-magnetization pulse corresponding to a first temperature range microwire element and a second re-magnetization pulse corresponding to a second temperature range microwire element. The first and second re-magnetization pulses are non-overlapping in the time domain. The processor is configured to determine the temperature based on the first and second re-magnetization pulses.

Another embodiment is a thermoplastic composite welding microwire temperature measurement system configured to locate a microwire temperature sensor on a weld line via sensor interrogation. The thermoplastic composite welding microwire temperature measurement system broadly comprises a reader, an antenna, a motorized stage, and a processor.

The reader is configured to transmit an AC current (i.e., instigation signal) that causes the antenna to generate an interrogation signal so that the microwire temperature sensor generates a response signal when the antenna is near the microwire temperature sensor. The motorized stage is configured to move the antenna along the weld line. The processor is configured to determine a position of the microwire temperature sensor based on the response signal.

Another embodiment is a thermoplastic composite welding microwire temperature measurement system for use with a thermoplastic composite welding system. The thermoplastic composite welding microwire temperature measurement system broadly comprises a number of antennae, a rail system, and a processor. The antennae are connected to one or more microwire readers whose combined function is to interrogate the microwire sensors, receive their re-magnetization signals, convert these signals to a sensor temperature, and report this temperature to the processor.

Each reader is configured to transmit an AC current (i.e., instigation signal) to its associated antenna so that the antenna transmits an interrogation signal and so that the reader (or the computer/processor) receives a response signal from the microwire temperature sensor when the antenna is near the microwire temperature sensor. The rail system includes a motorized stage configured to effect linear motion and a number of carriages driven by the motorized stage. The antennae are attached, directly or indirectly, to the carriages so the motorized stage is configured to move the antennae along a weld line. The processor is configured to instruct the motorized stage to move the antennae along the weld line during a welding operation of the thermoplastic composite welding system so that temperature measurements follow closely to the welding operation.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein:

FIG. 3 is a plan view of a TPC Microwire Temperature Sensor Assembly of the TPC Welding Microwire Temperature Measurement System of FIG. 1;

Figure 1:
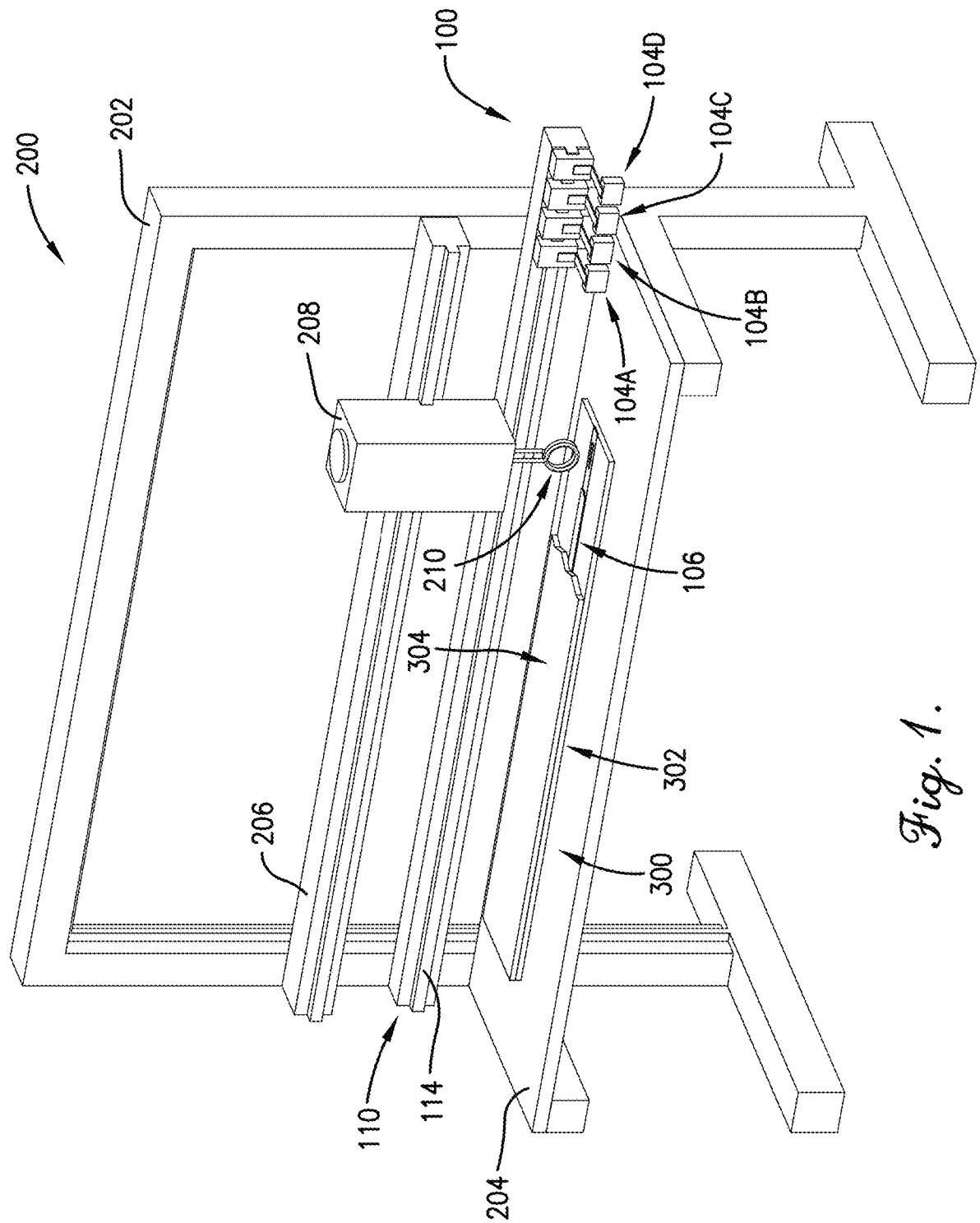
FIG. 1 is a perspective view of a Thermoplastic Composite (TPC) Welding System including a TPC Welding Microwire Temperature Measurement System constructed in accordance with an embodiment of the invention.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current technology can include a variety of combinations and/or integrations of the embodiments described herein.

The following patents are incorporated by reference in their entireties herein: U.S. Pat. No. 7,794,142, entitled "Magnetic Element Temperature Sensors" by Clothier, et al. and filed on Jan. 2, 2007; U.S. Pat. No. 8,192,080, entitled "Microwire-controlled autoclave and method" by Clothier and filed on Jan. 22, 2008; U.S. Pat. No. 8,251,581, entitled "Magnetic element temperature sensors" by Clothier, et al. and filed on Jan. 22, 2010; U.S. Pat. No. 8,258,441, entitled "Magnetic element temperature sensors" by Clothier and filed on May 7, 2007; U.S. Pat. No. 9,126,170, entitled "Microwire-controlled autoclave and method" by Clothier and filed on Apr. 26, 2012; and U.S. Pat. No. 9,212,955, entitled "Microwire temperature sensors constructed to eliminate stress-related temperature measurement inaccuracies and method of manufacturing said sensors" by Clothier and filed on Mar. 5, 2012. The above patents are hereinafter the "Clothier Prior Art".

Turning to FIGS. 1-4, a Thermoplastic Composite (TPC) Welding Microwire Temperature Measurement System 100 constructed in accordance with an embodiment of the invention is illustrated. The TPC Welding Microwire Temperature Measurement System 100 comprises one or more TPC Microwire Readers 102A-D, one or more TPC Microwire Antennae 104A-D, a TPC Microwire Temperature Sensor Assembly 106 including one or more Individual Microwire Temperature Sensors 108A-D, a Rail System 110 that moves the one or more TPC Microwire Antennae 104A-D into interrogation positions to interrogate the one or more Individual Microwire Temperature Sensors 108A-D, and a Measurement System Control Computer 112 including a processor that can control the operation of both the TPC Microwire Antennae 104A-D (and their associated Microwire Reader 102A-D or Microwire Readers if the Measurement System Control Computer 112 is not a Microwire Reader itself) and the Rail System 110, as well as interface with a TPC Welding System 200 (described below), firmware that controls the operation of one or more TPC Microwire Readers 102A-D powering the TPC Microwire Antennae 104A-D, firmware that controls the operation of the Rail System 110, and a user interface. It should be noted the Measurement Control System Computer 112 may be a Microwire Reader. Furthermore, it is important to note that elements 104A-D may be integrated reader/antennae devices, although this disclosure will treat the antenna and reader as separate, connected devices and thus will treat elements 104A-D as separate from the reader electronics. In this disclosure, the Reader provides alternating current to a separate Antenna, which in turn produces an interrogation alternating magnetic field. Methods employed during operation of some of its key components and an overall method of use of the TPC Welding Microwire Temperature Measurement System 100 have various novel aspects disclosed herein.

The TPC Welding Microwire Temperature Measurement System 100 is shown integrated with the aforementioned TPC Welding System 200. The TPC Welding System 200 includes a Tool 204 on which two Parts 302, 304, one on top of the other, are to be welded to form a Component 300. The Tool 204 is supported by a Welding System Frame 202 that has a Rail 206 upon which a Welding Head 208 is configured to move along a length of the Tool 204. The Welding Head 208 has an Integral Work Coil 210 through which current may be driven to produce a magnetic field that induces eddy currents to flow within the Parts 302, 304. The TPC Welding System 200 also includes an Induction System 212 configured to provide the current to the Integral Work Coil 210 and a Welding System Computer 214 configured to control motion of the Welding Head 208 and the current level provided to the Integral Work Coil 210. The TPC Welding System 200 may also include mechanisms to provide pressure upon the Parts 302, 304.

This disclosure primarily references induction welding but other welding such as resistance welding, ultrasonic welding, laser welding, and conduction welding could be implemented without departing from the scope of the invention. Furthermore, this invention, although described primarily in reference to thermoplastic composite material, is not limited to any specific type of thermoplastic material.

One objective of the present invention is to provide a rail system that can be easily attached to the Welding System Frame 202 or set up in a stand-alone manner adjacent the weld line and Tool 204 such that the track of the rail system runs parallel to the path of the Welding Head 208 as it moves along the length of the Tool 204. To that end, components of the Rail System 110 are shown attached to the Welding System Frame 202. The Rail System 110 includes a Motorized Linear Stage (or Slide) 114, a plurality of Driven Carriages 116A-D, and a plurality of Adjustable Elbow Joiners 118A-D. The Rail System 110 may be controlled by the Measurement System Control Computer 112 or may be controlled directly by the Welding System Computer 214.

The Motorized Linear Stage 114 may be chosen from many state-of-the-art existing devices, such as a model from the LTR-TC Series from Zaber Technologies. The Motorized Linear Stage 114 may have four Driven Carriages 116A-D, although fewer or more driven carriages may be used. Alternatively, should a custom motorized linear stage be cost prohibitive or otherwise unavailable, four (or more) LTR-TC Series single-carriage slides can be mounted on the Welding System Frame 202. At least the following are important regarding the Motorized Linear Stage 114: it should be able to achieve maximum linear speeds of at least that of the fastest speed of the Welding Head 208, it should allow computer control of the position and speed of the Driven Carriages 116A-D, and it should allow position knowledge of the Driven Carriages 116A-D. Preferably, the maximum speed of the Driven Carriages 116A-D is at least 125 mm/s.

The Adjustable Elbow Joiners 118A-D attach the TPC Microwire Antennae 104A-D to the Driven Carriages 116A-D. The Adjustable Elbow Joiners 118A-D must be rigid enough to hold lateral and vertical position (relative to the Tool 204 and Parts 302, 304) constant while in motion (preferably allowing no more than +/-0.5 mm travel in either direction during normal motion). The Adjustable Elbow Joiners 118A-D should not be constructed of a ferromagnetic metal material. The preferred material for the Adjustable Elbow Joiners 118A-D is a high-temperature, rigid, thermoset composite material with non-ferromagnetic metallic fasteners that allow for lateral and vertical adjustment of the position of the connected TPC Microwire Antennae 104A-D.

Figure 2:
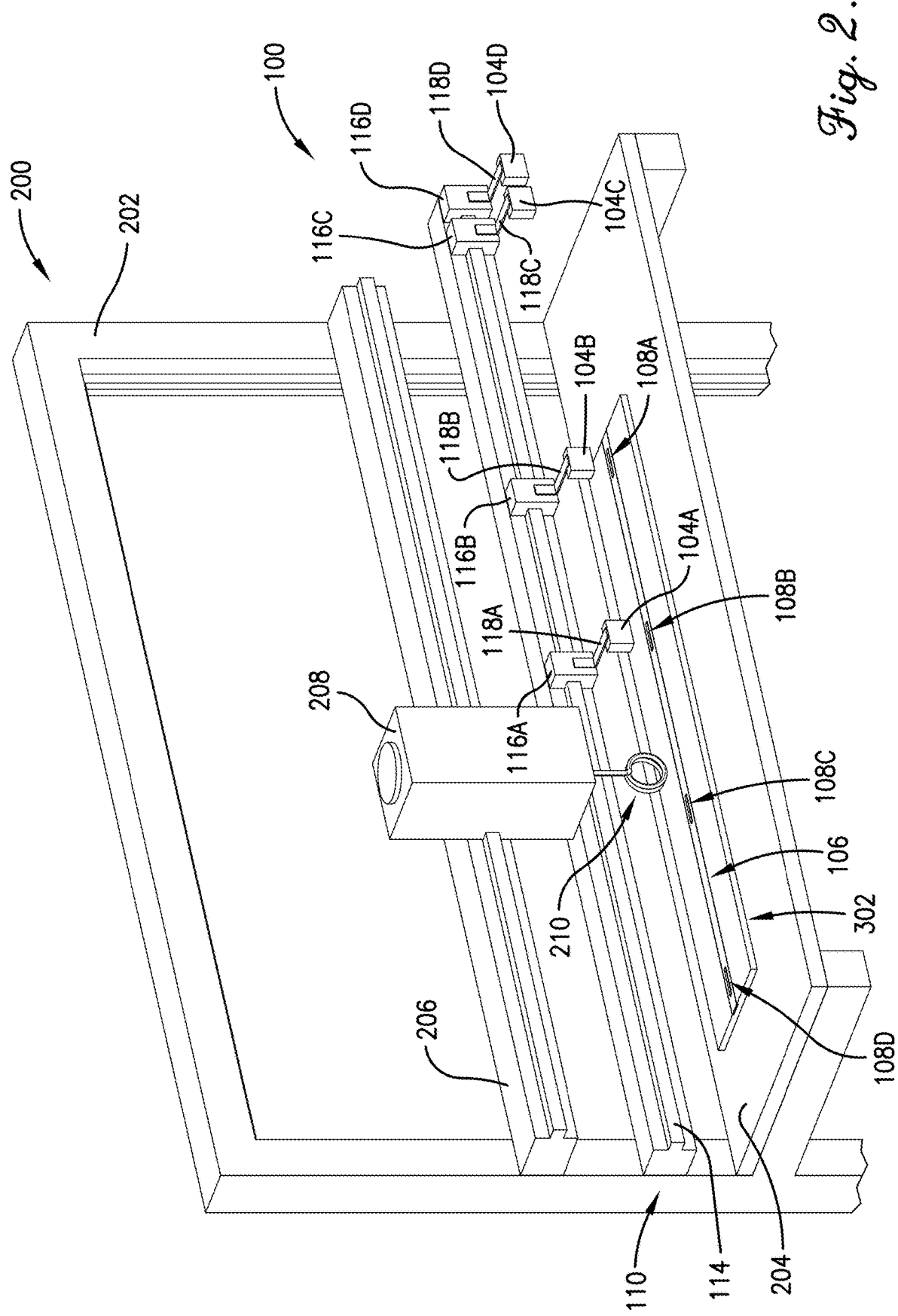
FIG. 2 is another perspective view of the TPC Welding System and TPC Welding Microwire Temperature Measurement System of FIG. 1.
Figure 4:
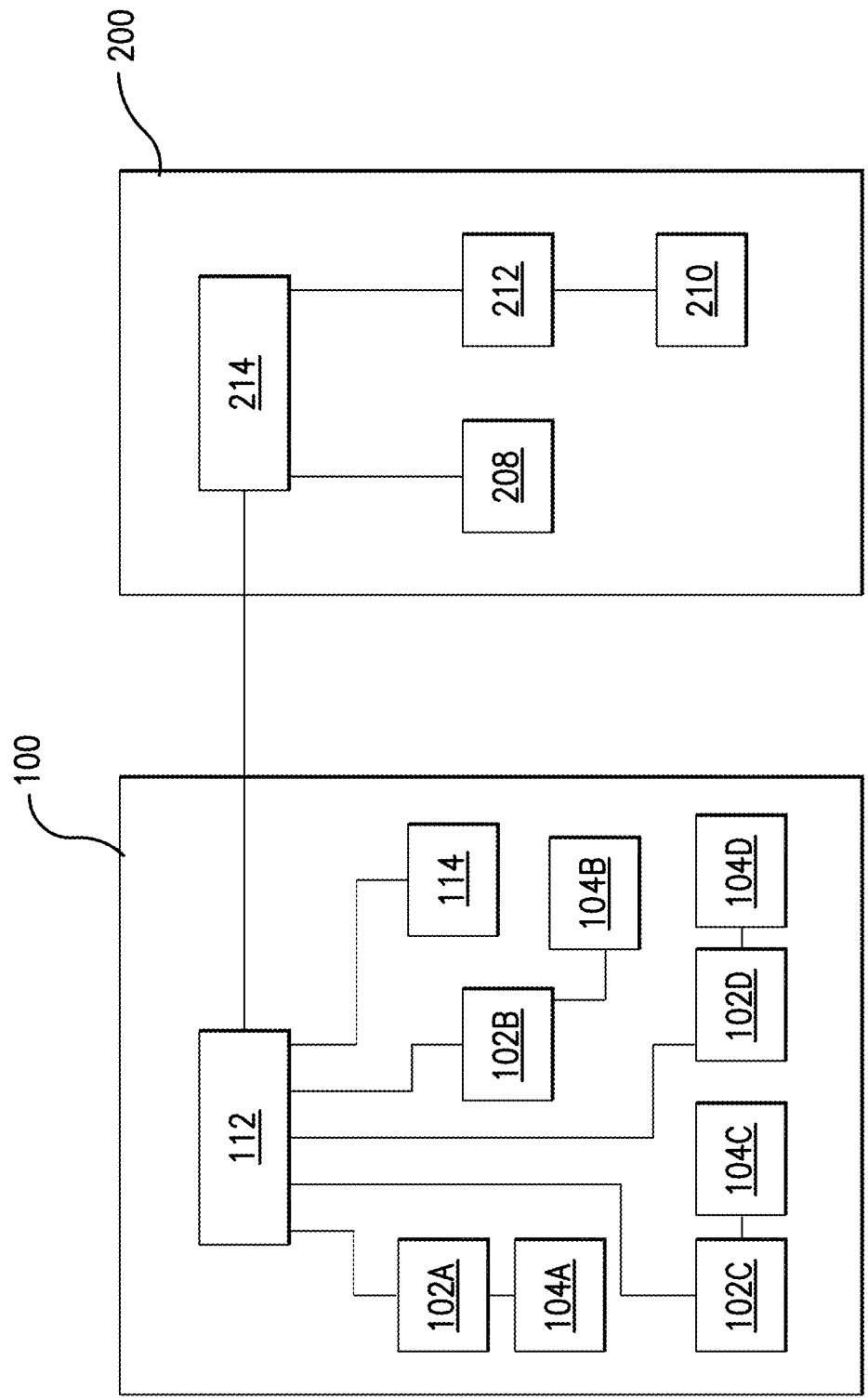
FIG. 4 is a schematic diagram of certain components of the TPC Welding System and TPC Welding Microwire Temperature Measurement System of FIG. 1.

The Adjustable Elbow Joiners 118A-D should allow for easy adjustment of its vertical and horizontal position (relative to the Tool 204) so that it may place and maintain the connected TPC Microwire Antenna's bottom surface generally parallel to the surface of the Tool 204 during the welding process. It should also be able to place and maintain the axis of the antenna's field lines parallel with the weld line axis and also with the longitudinal axis of the TPC Microwire Temperature Sensor Assembly 106 and its constituent Individual Microwire Temperature Sensors 108A-D. It should adjustable so as to align the center of the antenna's bottom surface with the center of the weld line so that the magnetic field density is a maximum along the weld line at all times during the welding procedure. This is important because that is where the location of the TPC Microwire Temperature Sensor Assembly 106 and its constituent Individual Microwire Temperature Sensors 108A-D should be. FIG. 2 shows two TPC Microwire Antennae 104A,B being driven along the Tool 204 such that their bottom surface's geometric center-points are directly over the weld line of the Parts 302, 304. In this figure, the field lines generated by each antenna are generally parallel to the weld line, which is co-located and co-aligned with longitudinal axis of the exposed TPC Microwire Temperature Sensor Assembly 106.

With particular attention to FIG. 3, one purpose of this present invention is to provide a TPC microwire temperature sensor assembly, as part of the TPC Welding Microwire Temperature Measurement System 100, that can provide accurate temperatures at multiple physical locations while experiencing a range of operating temperatures that bracket the optimum bonding temperature of TPC materials by approximately 50 degrees Celsius (90 degrees Fahrenheit), with a maximum operating temperature during a TPC welding operation of approximately 455 degrees Celsius (850 degrees Fahrenheit). To that end, the TPC Microwire Temperature Sensor Assembly 106 includes at least two Individual Microwire Temperature Sensors 108A-D.

Turning to FIG. 3A and with reference to FIG. 3, each Individual Microwave Temperature Sensor 108A-D may include a First Temperature Range Element 120, a Second Temperature Range Element 122, and a Reference Element 124 having different Curie temperatures. Since one typical TP resin used in TPC materials has an optimum bonding temperature of 350 degrees Celsius (662 degrees Fahrenheit), the First Temperature Range Element 120 may have a Curie temperature of 300 degrees Celsius (572 degrees Fahrenheit) and the Second Temperature Range Element 122 may have a Curie temperature of 400 degrees Celsius (752 degrees Fahrenheit). The Reference Element 124 may have a Curie temperature of approximately 550 degrees Celsius (1022 degrees Fahrenheit). Other TP resins used in TPC materials may require a different Individual Microwire Temperature Sensor 108 suitable for bonding that class of TPC materials. In such a case, the Curie temperatures of the First and Second Temperature Range Elements 120, 122 may be different, via changes to microwire metallurgy, to similarly bracket its TP resin optimum bonding temperature. The Reference Element 124 will preferable remain the same.

The First and Second Temperature Range Elements 120, 122 should have Curie temperatures that define the minimum and maximum allowable temperatures that the thermoplastic composite internal weld line should achieve in order to produce a satisfactory weld. The First and Second Temperature Range Elements 120, 122 should also be temperature sensitive over a wide range of temperatures below their respective Curie temperatures.

The Reference Element 124 should serve to normalize the response signals from the First and Second Temperature Range Elements 120, 122 and provide a re-magnetization response each time it is interrogated at all expected temperatures during a thermoplastic composite weld. The Reference Element 124 must have a Curie temperature in excess of any expected temperature during a thermoplastic composite weld, even in the event of overheating the Parts 302, 304 above their maximum allowable weld temperature. The Reference Element 124 need not be temperature sensitive over the range of temperatures experienced during a thermoplastic composite welding operation.

The First and Second Temperature Range Elements 120, 122 and the Reference Element 124 (also referred to as microwire elements) may be bonded together with flowable, high-temperature silicone (or other high-temperature) adhesive into a bundle from their individual long lengths (approximately one meter long) of microwire. Each of the three microwire elements will have metal outer diameters on the order of 35 micrometers with glass outer diameters of approximately 45 micrometers. The resultant bundle is dredged in powdered dry lubricant, preferably molybdenum disulfide powder, while the silicone adhesive is still tacky so as to coat the outer bundle surfaces completely. The long bundles are first air dried for approximately 12 hours and then annealed in a controlled oven starting at room temperature at a constant climb rate to a temperature just exceeding the Curie temperature of the microwire element with the highest Curie temperature before descending at the same constant rate back to room temperature for five consecutive cycles. Once cooled, these bundles are cut into segments of approximately 30 mm length. The short-length bundles are inserted into NiTi tubing segments, already spot-welded (or laser-welded) closed on one end, with an inner diameter (ID) of approximately 178 micrometers and an outer diameter (OD) of approximately 250 micrometers. Once inserted and forced toward the tube end already sealed, the opposite tube end is welded closed.

This resultant 250 micrometer OD by approximately 32 mm long tube is a single one of the Individual Microwire Temperature Sensor 108A-D, but not the TPC Microwire Temperature Sensor Assembly 106. The TPC welding process will typically require multiple temperature sensing points. Thus, what will be provided to the user as TPC Microwire Temperature Sensor Assembly 106 is a neat strip of TP resin that is at least 170 mm long and is approximately 12 mm wide. This neat strip is preferably comprised of two thinner neat Resin Strips 126, 128 of approximately 0.15 mm thick neat resin that are heat-staked together at various points (or fully melted together along their entire length) so as to capture, between the Resin Strips 126, 128, one Individual Microwire Temperature Sensor 108A-D every 130 mm lengthwise (tube center point to tube center point). The position of each Individual Microwire Temperature Sensor 108A-D is at the midpoint of the strip's width and its longitudinal axis is aligned with long axis of the strip. Any other means of securing the Individual Microwire Temperature Sensor 108A-D to the neat resin strip is also possible.

Preferably, this resultant TPC Microwire Temperature Sensor Assembly 106 strip is very long and, when packaged for distribution to users, resembles a roll of tape wound on a square bobbin. Preferably, the location of each Individual Microwire Temperature Sensor 108A-D along the TPC Microwire Temperature Sensor Assembly 106 is visibly marked such as with a contrasting-color ink. When ready for use to insert into the weld line for a welding process, the user may unroll the amount of strip from its square bobbin necessary to place a desired number of Individual Microwire Temperature Sensors 108A-D within the weld line, cut the strip to that length, and insert the resultant cut strip into the weld line.

The metallurgy of the metal core constituent glass-coated microwires preferably used for making the First and Second Temperature Range Elements 120, 122 has a base-alloy of (Fe80 Co20), which is 80% by molecular weight Iron and 20% by molecular weight Cobalt. This base-alloy metal has a nominal Curie temperature of 450 C and can successfully be manufactured into microwires for this invention. Furthermore, this base metal can have its Curie temperature reduced by adding small molecular weights of impurities such as Aluminum and/or others. Other possible base-ally metallurgies for the metal core of the Temperature Range Elements 120, 122 of the present invention are (Fe5 Co70 Si15 B10) and (Fe65 Co25 Sc10).

The metallurgy of the metal core of the glass-coated microwire Reference Element 124 preferably is the FINEMENT® alloy (Fe Nb Cu B Si), made by Hitachi Metals Limited and others. A paper describing the use of FINEMENT® alloys in microwire elements entitled "Annealing induced evolution of structure and high frequency magnetic properties in nanocrystalline glass-coated microwires" by Antonenco, et. al. and published in Materials Science and Engineering A 304-306 in 2001, pages 975 to 978 is hereby incorporated by Reference, since, in addition to the Clothier Prior Art, it describes important aspects of manufacturing and annealing glass coated microwires of FINETMET® alloy cores useful for the Reference Element 124.

The above method of producing temperature-sensitive amorphous or microcrystalline glass-coated microwires is suitable for forming the Temperature Range Elements 120, 122 and for altering their Curie temperatures. Thus, these methods will be used to tailor the Curie temperatures of the temperature range elements used for all families of TPC microwire temperature sensors of this invention.

While providing the ability to measure an accurate temperature of multiple microwire temperature sensors exposed to a wide range of temperatures below and above the TPC melting temperature without requiring calibration of each sensor to a known temperature before the measurements are initiated is critical to the success of this invention, it is also important to provide the ability to quickly and automatically deploy an antenna to a location above the center position of a microwire temperature sensor located within the weld line so as to successfully interrogate it and determine an accurate temperature without foreknowledge of the position of that sensor. To provide such a means requires an apparatus and an accompanying method. To be successful in the marketplace, the apparatus must be easily installed in conjunction with as many existing TPC welding systems as possible to ensure proper operation.

Furthermore, it is not enough to create an apparatus that is easy to install and easy to use and allows deployment of the TPC Microwire Antennae 104A-D to positions along the tool axis of Individual Microwire Temperature Sensors 108A-D. When inserting a TPC Microwire Temperature Sensor Assembly 106 along the centerline of the weld line between the two Parts 302, 304 to be induction welded, the technician executing the induction weld must not be required to place the TPC Microwire Temperature Sensor Assembly 106 such that its Individual Microwire Temperature Sensors 108A-D lay at pre-determined positions along the Tool 204. To prevent undue extra labor for the technician, he/she also should not be forced to measure the position of each Individual Microwire Temperature Sensor 108A-D relative to some known point and somehow input this information into the Rail System Control Computer's user interface so that the Driven Carriages 116A-D move to those exact locations. Not only would that impose an extra burden upon the technician but it may lead to inaccurate temperature measurements (either no temperature measurement at all or an inaccurate temperature measurement if the antenna is not placed properly over the intended Individual Microwire Temperature Sensor 108A-D during temperature measurement interrogation).

Figure 5:
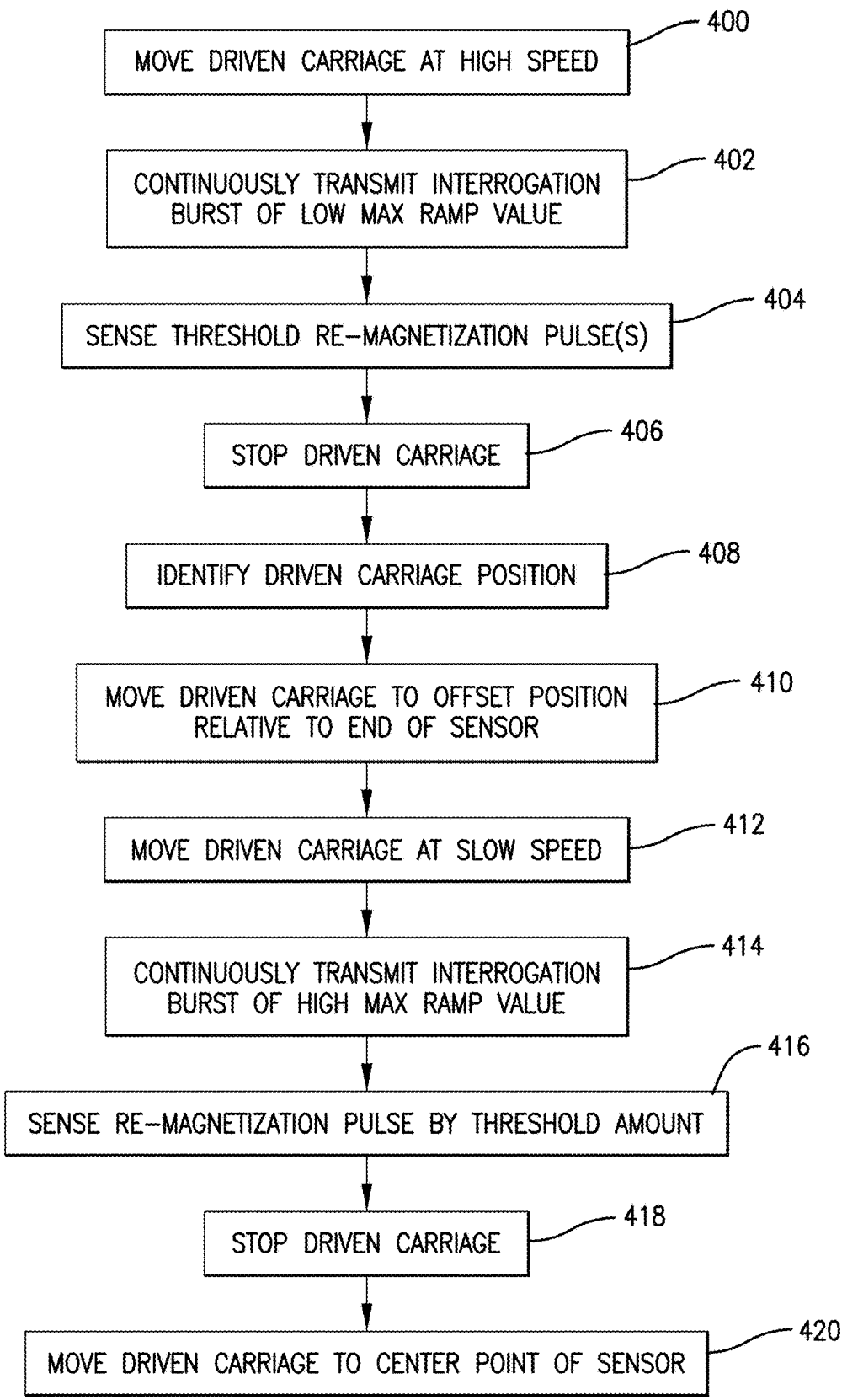
FIG. 5 is a flow diagram of certain method steps in accordance with an embodiment of the invention.

With reference to FIG. 5, an automatic "Sensor-Finding" method, employed by the Measurement System Control Computer 112, that allows computer-controlled Driven Carriages 116A-D to stop an attached, fast-moving TPC Microwire Antenna 104A-D directly over the center-point of an Individual Microwire Temperature Sensor 108A-D such that it is in optimum position to measure an accurate temperature is presented. Providing this "Sensor-Finding" method and implementing it within the TPC Welding Microwire Temperature Measurement System 100 is an objective of this invention.

It has been found that the center of the longitudinal axis length of the TPC Microwire Antenna 104A with a standard solenoidal transmit coil should be placed+/−5 mm from the center of the longitudinal axis length of an Individual Microwire Temperature Sensor 108A-D of length 30 mm in order to achieve optimum temperature measurement accuracy. Thus, an objective of this invention is that the "Sensor-Finding" method should allow the Motorized Linear Stage 114 to be controlled by the Measurement System Control Computer 112 so as to achieve antenna placement. Another objective is that this "Sensor-Finding" method should utilize information that is solely gathered from the Individual Microwire Temperature Sensors 108A-D themselves during interrogations executed while the TPC Microwire Antenna 104A is moving and should not require the input of any Individual Microwire Temperature Sensor position information into the Measurement System Control Computer 112 by the technician executing the welding procedure.

The Rail System 110 uses re-magnetization information gathered by the TPC Microwire Reader 102A or Measurement System Control Computer 112 as the rapidly-moving TPC Microwire Antenna 104A interrogates Individual Microwire Temperature Sensors 108A-D along the length of the TPC Microwire Temperature Sensor Assembly 106 placed within the weld line during a welding process to achieve these objectives. In operation, there are two phases to the "Sensor-Finding" process of finding the position of an Individual Microwire Temperature Sensor 108A-D and stopping the TPC Microwire Antenna 104A directly over the center point of that Individual Microwire Temperature Sensor 108A-D to allow for a successful and accurate temperature measurement: the "Fast Speed" phase and the "Slow Speed" phase.

During the "Fast Speed" phase during a welding procedure, the Measurement System Control Computer 112 directs the Driven Carriage 116A to move from its present position at high speed, preferably 35 mm/second, until it stops just after its attached TPC Microwire Antenna 104A, the associated Microwire Reader 102A, or the Measurement System Control Computer 112 first senses the presence of an Individual Microwire Temperature Sensor 108A-D in its TPC Microwire Antenna's path. The "re-magnetization information" used to sense this presence is the non-zero integral of a detected Second Temperature Range Element 122 re-magnetization pulse. During the "Fast Speed" phase motion of the Rail System 110, the Microwire Reader 102A is continuously sending out short bursts of ramped, constant frequency AC current through its associated fast-moving TPC Microwire Antenna 104A so as to continuously send out short interrogation bursts (preferably a transmission period of 100 milliseconds) of ramped alternating magnetic field intensity with the "low" maximum intensity level previously determined during the TPC Initial Calibration process (i.e., mode). During this "Fast Speed" phase of operation, the TPC Microwire Reader 102A or the Measurement System Control Computer 112 looks for 5 re-magnetization pulses of the Second Temperature Range Element 122, integrates each pulse, averages the integrals, and compares this average value to a preset minimum threshold value. When this average Second Temperature Range Element 122 integral value exceeds a preset minimum threshold value, the Measurement System Control Computer 112 sends a signal to the Motorized Linear Stage 114 to execute a hard stop of its motor. This causes the Driven Carriage 116A and its attached TPC Microwire Antenna 104A to stop. Using the position information available to the Measurement System Control Computer 112 by the Motorized Linear Stage 114, the Driven Carriage 116A position at the time which the hard stop command was sent is put in memory as Position A. The Measurement System Control Computer 112 then sends a signal to the Motorized Linear Stage 114 to move the Driven Carriage 116A and its attached TPC Microwire Antenna 104A to a position of A+5 mm. This puts the TPC Microwire Antenna's center point above and just beyond the lateral beginning point of the Individual Microwire Temperature Sensor's 30 mm length, (well before the center point of its 30 mm length) and in position to begin the "Slow Speed" phase during this welding operation.

Testing has shown that two Individual Microwire Temperature Sensors 108A-D separated by 130 mm from center-to-center do not allow the TPC Microwire Antenna 104A, during this "Fast Speed" phase, to detect any re-magnetization pulses whose integral exceeds the preset threshold value until the center of the longitudinal axis of the TPC Microwire Antenna 104A arrives directly over a spot that is 5 mm before the approaching end of a 30 mm long Individual Microwire Temperature Sensor 108A-D.

During the "Slow Speed" phase during a welding procedure, the Measurement System Control Computer 112 directs the Driven Carriage 116A to move from its present position at slow speed, preferably 20 mm/second. During the "Slow Speed" phase motion of the Rail System 110, the Microwire Reader 102A is continuously sending out short bursts of ramped, constant frequency AC current through its associated fast-moving TPC Microwire Antenna 104A so as to continuously send out short interrogation bursts (preferably a transmission period of 100 milliseconds) of ramped alternating magnetic field intensity with the "high" maximum ramp intensity previously determined during the TPC Initial Calibration process. Furthermore, the Measurement System Control Computer 112 will be storing into memory the position of the Driven Carriage 116A at the time of commencement of each interrogation burst. The "high" maximum ramp speed is used because, during the welding procedure, the "Slow Speed" phase will most likely occur with the induction coil already having passed the position of this Individual Microwire Temperature Sensor 108A-D. Thus, the temperature of the Individual Microwire Temperature Sensor 108A-D will be increasing rapidly. This means that the integral of the re-magnetization pulse of the Second Temperature Range Element 122 will also be decreasing during the "Slow Speed" phase. For the "Sensor-Finding" algorithm to work optimally, focus should be on the re-magnetization pulse integral of the Reference Element 124 because its integral will remain constant during the "Slow Speed" phase. During this "Slow Speed" phase of operation, the TPC Microwire Reader 102A or the Measurement System Control Computer 112 looks for 5 re-magnetization pulses of the Reference Element 124, integrates each pulse, averages the integrals, and compares this average value to the previous average value calculated (assuming the previous value is 0 for the very first comparison during the "Slow Speed" phase. When this average Reference Element re-magnetization pulse integral value first becomes less than the previous Reference Element re-magnetization pulse integral value by a greater margin than a preset minimum threshold value, the Measurement System Control Computer 112 sends a signal to the Motorized Linear Stage 114 to execute a hard stop of its motor. This causes the Driven Carriage 116A and its attached TPC Microwire Antenna 104A to stop. Using the position information available to the Measurement System Control Computer 112 by the Motorized Linear Stage 114, the Driven Carriage 116A is then moved to a final position that is the average position of the previous two interrogations. This puts the TPC Microwire Antenna's center point above and over the center point of the Individual Microwire Temperature Sensor's 30 mm length, (+/−5 mm) and in position to begin making accurate temperature measurements.

Previously, it was discussed that the preferred re-magnetization information that the "Sensor-Finding" method uses is the integral of re-magnetization pulses. It is also possible to use the pulse amplitude of the re-magnetization pulses since most functions of the "Sensor-Finding" method employ a relative comparison between values.

Figure 6:
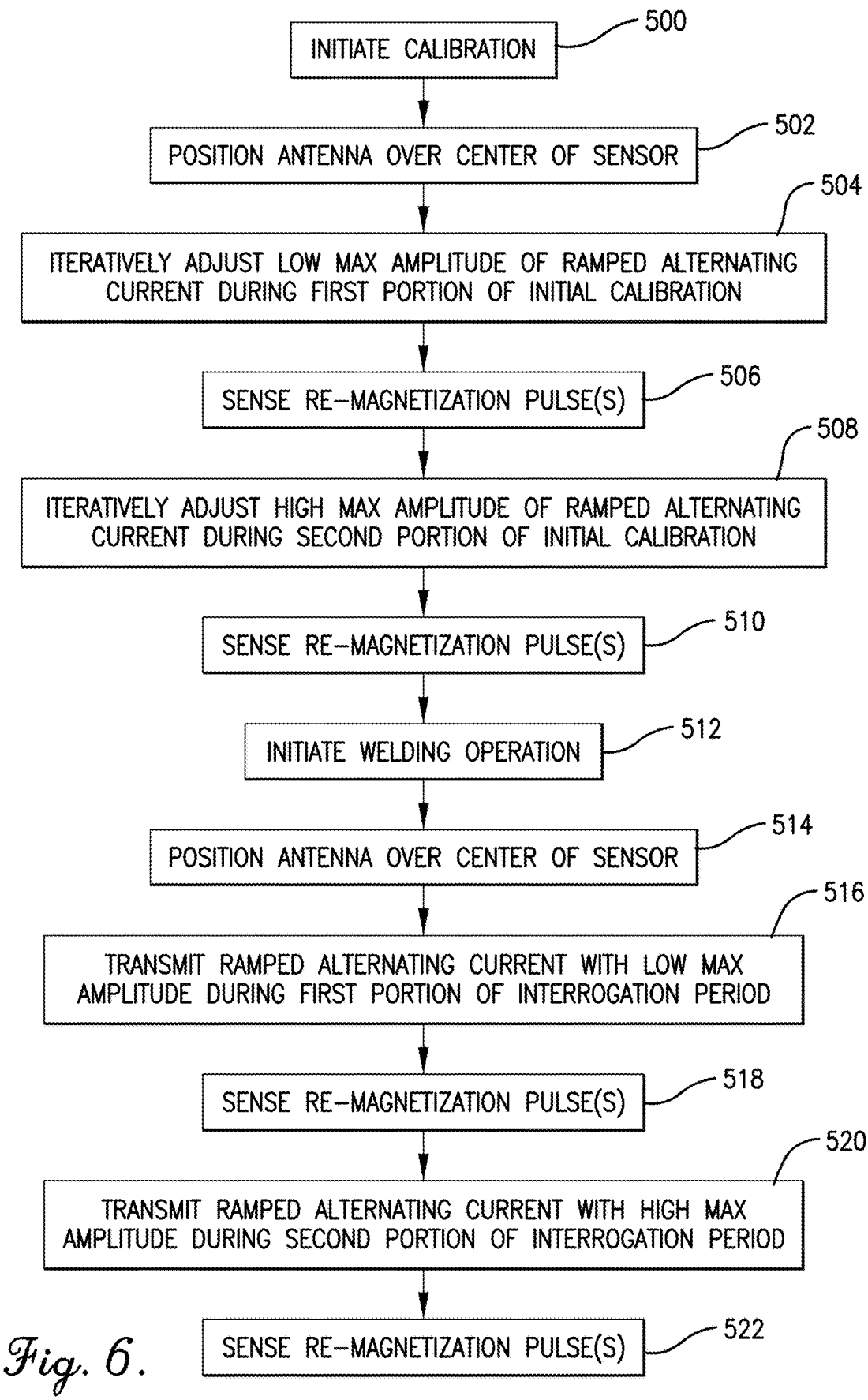
FIG. 6 is a flow diagram of certain method steps in accordance with another embodiment of the invention.

Turning to FIG. 6, another purpose of this present invention is to provide a novel means to interrogate, for temperature sensing, an Individual Microwire Temperature Sensor 108A-D of the TPC Microwire Temperature Sensor Assembly 106 such that each non-zero-voltage portion of each individual microwire element's re-magnetization pulse can be completely and independently detected out of phase from each other's pulse in the time domain. In other words, the full re-magnetization pulse of each of the First and Second Temperature Range Elements 120, 122 and the Reference Element 124 must not overlap in the time domain. This non-overlap will allow the interrogation TPC Microwire Reader 102A-D to calculate the precise value of the integral of each pulse's voltage over time, when making a temperature measurement. These individual integral values are used to determine the temperature information as described below and are also essential to measure an accurate temperature of a microwire temperature sensor, exposed to a wide range of temperatures below and above the TPC melting temperature, without requiring calibration of the sensor to a known temperature before said measurements are initiated.

Only one initial calibration of the TPC Welding Microwire Temperature Measurement System 100 (initiated in block 500 of FIG. 6) will be required for a given physical welding setup before any number of welding operations can be executed with accurate temperature information being output from the TPC Welding Microwire Temperature Measurement System 100. Furthermore, during that one initial calibration, no knowledge of the present temperature of the TPC Microwire Temperature Sensor Assembly 106 is required, since reliance is on the mapping coefficients that are determined by multiple test runs for a given family of Individual Microwire Temperature Sensors 108A-D well before any TCP welding operation is initiated by the user.

The TPC Initial Calibration is done with only the first TPC Microwire Antenna 104A placed over an Individual Microwire Temperature Sensor 108A of the family of such sensors that will be used during all subsequent TPC welding operations on the Tool 204. This Individual Microwire Temperature Sensor 108A used for the initial calibration as part of the TPC Microwire Temperature Sensor Assembly 106 is placed within the weld line of the representative Parts 302, 304 to be welded in future welding operations while those Parts 302, 304 are in place on the Tool 204. Preferably, these Parts 302, 304 are near room temperature during this calibration process. Once the center of the longitudinal axis of the TPC Microwire Antenna 104A is placed directly over the center of the longitudinal axis of the Individual Microwire Temperature Sensor 108A (preferably within +/−1 mm), as shown in block 502, the TPC Microwire Antenna 104A begins interrogating the Individual Microwire Temperature Sensor 108A via short intervals of a constant frequency, ramped AC current transmitted through the TPC Microwire Antenna 104A transmit coil, starting with a low maximum ramp amplitude, as shown in block 504. This ramped AC current produces a ramped alternating magnetic field of low maximum intensity. The TPC Microwire Reader 102A or the Measurement System Control Computer 112 detects the peaks of the re-magnetization pulses of the First Temperature Range Element 120 and Second Temperature Range Element 122 and measures the separation between those peaks, as shown in block 506. Should the separation between those peaks not equal the desired value that is present in the firmware (preferably a separation in the time domain of 400 microseconds), the TPC Microwire Reader 102A then adjusts the maximum amplitude of the ramped AC current for another short interval and re-measures the re-magnetization pulse peak-to-peak interval. This process continues iteratively until the optimum value of maximum intensity of the ramped AC field, and thus the optimum value of maximum antenna current value of the ramped AC current is found that causes the peak-to-peak re-magnetization pulse interval to be at the desired separation in the time domain. At this point, the TPC Microwire Reader 102A begins this process over again, this time using a high starting maximum amplitude, constant frequency ramped AC current, as shown in block 508. This time, the Second Temperature Range Element 122 and the Reference Element 124 are the microwires whose re-magnetization pulses are being detected (block 510) and separated via the same iterative process. Once this TPC Initial Calibration is complete, no subsequent calibration of the TPC Welding Microwire Temperature Measurement System 100 need be made for this physical setup (this Tool 204, all TPC Microwire Antennae 104A-D used, and all Individual Microwire Temperature Sensors 108A-D of the type of TPC Microwire Temperature Sensor Assembly 106 used). All subsequent temperature measurements of any number of Individual Microwire Temperature Sensors 108A-D (of the same family of constituent microwires) will use these same "low" and "high" maximum ramp current amplitude values to successfully measure accurate temperatures in the manner described herein. It is important to note that the same frequency is used for all "low" and "high" current transmissions from the Reader(s) to the Antenna(e) during temperature measurements.

A welding operation can then be initiated, as shown in block 512. In order to achieve independently-detected re-magnetization pulses during sensor interrogation, two different interrogation alternating magnetic field intensities are used during each temperature measurement interrogation period of an Individual Microwire Temperature Sensor 108A-D. A ramped alternating current (preferably a triangular waveform of desired period) will be sent by the TPC Microwire Reader 102A-D through the TPC Microwire Antennae 104A-D that are positioned adjacent (e.g., over the center of) the Individual Microwire Temperature Sensors 108A-D for a specified number of AC cycles (said specified number of cycles representing the full interrogation period for as single temperature measurement) when a measurement is made. However, rather than, as in the prior art, using a single maximum amplitude of this ramped alternating antenna current during each full temperature measurement interrogation period, this present invention uses at least two different maximum amplitudes of the ramped alternating current signal during a complete temperature measurement interrogation period of the Individual Microwire Temperature Sensor 108A-D. Preferably, a low maximum amplitude ramped alternating current (preferably a triangular waveform of frequency approximately 400 Hz) signal will be provided by the TPC Microwire Reader 102A-D to the TPC Microwire Antenna 104A-D during the first half of the interrogation period as shown in blocks 516 and 518, while a same-frequency alternating current ramped signal of higher maximum amplitude will be provided to the TPC Microwire Antenna 104A-D during the second half of the interrogation period, as shown in blocks 520 and 522. This produces a constant frequency interrogation alternating magnetic field with a periodic amplitude ramp that reaches a low maximum field intensity, for example 25 A/m, during the first half of the interrogation period, but reaches a higher maximum field intensity during each ramped cycle, for example 80 A/m, during the second half of the interrogation period.

What is important about the choice of the "low" and "high" maximum ramp amplitudes of Reader transmit alternating current used is what they produce in the Individual Microwire Temperature Sensor response. It is also important that these choices will be made only once before starting a series of TPC welding operations: during the TPC Initial Calibration where the TPC Microwire Reader 102A-D iteratively adjusts the maximum amplitude of the ramped AC current provided to the TPC Microwire Antenna 104A-D during the first half-period of the interrogation as described above, and during the second half-period interrogation, until it selects the optimum maximum amplitude values.

During each temperature measurement interrogation cycle of this invention, the maximum current amplitude of the ramped alternating current passed through the transmit coil of the interrogating antenna is changed from low to high values, where these low and high values are determined during a TPC Initial Calibration. This allows, during the interrogation period of each measurement, the re-magnetization voltage pulses of all three constituent microwires of an Individual Microwire Temperature Sensor 108A-D to be fully and independently detected and integrated for use in a novel method of providing temperature information, which is another purpose of the present invention. It should be noted that the interrogation period need not be necessarily split exactly in half, nor must the current frequency be identical in each half-period to achieve this goal.

In more detail, and with reference to FIGS. 7-13, a purpose of the present invention is to provide a novel means to use the integrated value over time of the detected re-magnetization voltage pulse of each of the First and Second Temperature Range Elements 120, 122 and of the Reference Element 124 to provide the following temperature information to the user: knowledge that a particular Individual Microwire Temperature Sensor 108A-D is experiencing a temperature that exists in one of three zones: a) Zone One 130, which is a temperature at or below the Curie temperature of the Temperature Range Elements with the lowest Curie temperature (hereafter called the First Temperature Range Element 120); b) Zone Two 132, which is a temperature above the Curie temperature of the First Temperature Range Element 120 and below the Curie temperature of the Temperature Range Element with the highest Curie temperature (hereafter called the Second Temperature Range Element 122); and c) Zone Three 134, which is a temperature at and above the Curie temperature of the Second Temperature Range Element 122; knowledge of the exact temperature (within an accuracy of approximately +−2.0 degrees Celsius or better) a particular Individual Microwire Temperature Sensor 108A-D is experiencing when said sensor's temperature exists within Zone Two 132; and knowledge of the exact temperature (within an accuracy of approximately +−4.0 degrees Celsius or better) a particular Individual Microwire Temperature Sensor 108A-D is experiencing when said sensor's temperature exists within Zone One 130 and is less than 50 degrees Celsius below the Curie temperature of the First Temperature Range Element 120.

Figure 7:
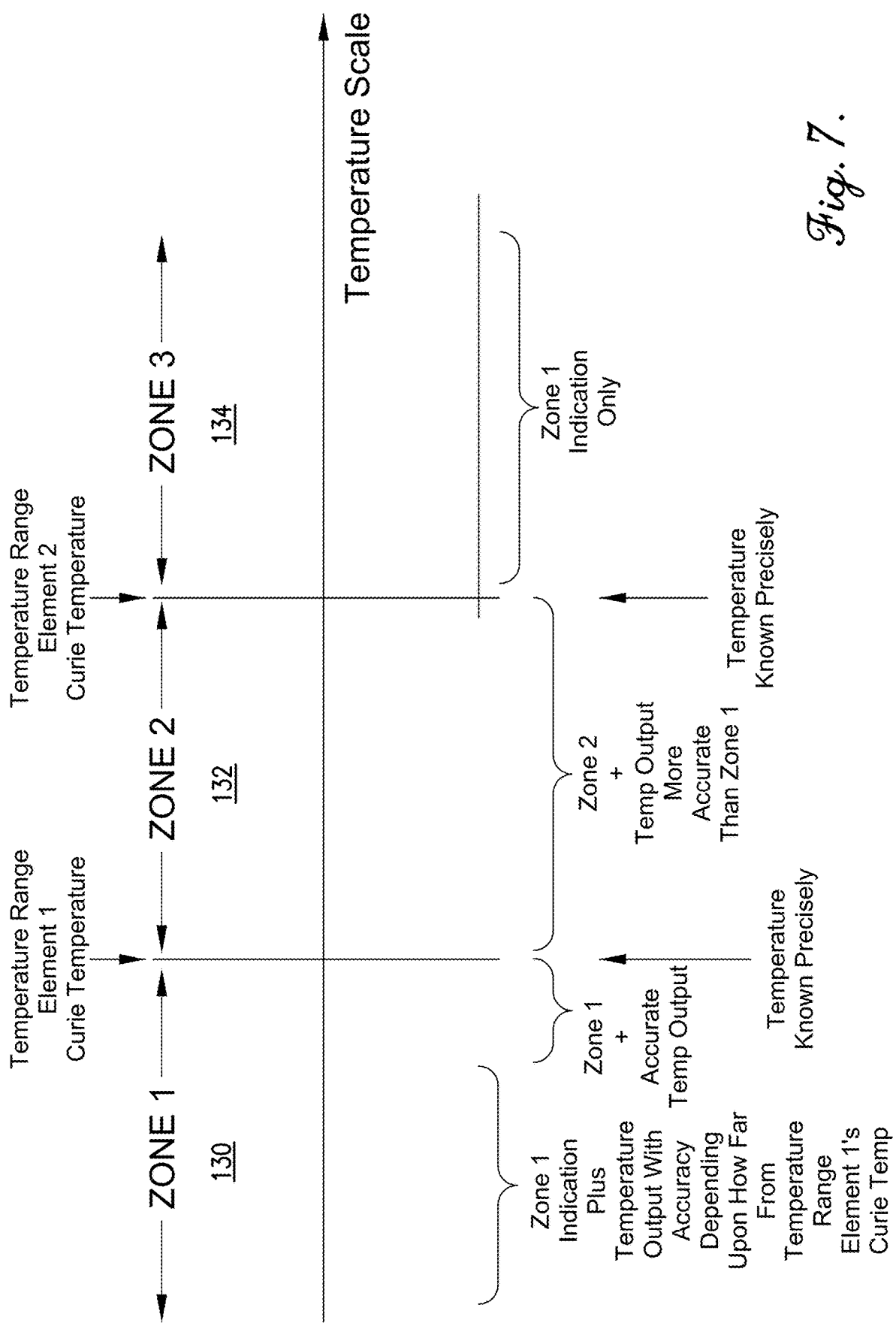
FIG. 7 is a graphical depiction of temperature zones utilized by the TPC Microwire Temperature Sensor Assembly in accordance with an embodiment of the invention of the invention.

FIG. 7 shows a simple state map showing the type of temperature information that an Individual Microwire Temperature Sensor 108A-D will provide the user via calculation and output from the TPC Microwire Reader 102A-D. This state map is predicated on the sensor existing in a continuum of temperatures shown as starting on the left side of FIG. 7 and increasing along the Temperature Scale axis. The user will be reported that the Individual Microwire Temperature Sensor 108A-D is in one of the three zones (Zone One 130, Zone Two 132, and Zone Three 134). The Curie temperatures of the First Temperature Range Element 120 and the Second Temperature Range Element 122 are precisely known due to testing in the laboratory of the metals used to form the microwire elements.

Starting from the low end of the Temperature Scale line and moving toward higher temperatures, FIG. 7 shows what definitive temperatures are calculated and output to the associated Measurement System Control Computer 112 as an Individual Microwire Temperature Sensor 108A-D passes through a range of temperatures experienced during a TPC welding process. Within Zone One 130, the temperature will be reported as an exact temperature each time the Individual Microwire Temperature Sensor 108A-D is interrogated for a temperature measurement at various levels of accuracy, depending upon how far the sensor temperature is from the First Temperature Range Element's Curie temperature. It has been found that, if the Individual Microwire Temperature Sensor temperature is less than 50 degrees Celsius below the Curie temperature of the First Temperature Range Element 120, temperature accuracies of +−4.0 degrees Celsius can be achieved. Once the sensor temperature is more than 50 degrees Celsius below the Curie temperature of the First Temperature Range Element 120, the sensor accuracy decreases as a function of the delta temperature between sensor and said Curie temperature.

This variable sensor accuracy during Zone One 130 is due to the non-linear change in the Measurable of the Individual Microwire Temperature Sensor 108A-D as a function of temperature. The preferable Measurable of the Individual Microwire Temperature Sensor 108A-D within Zone One 130 is the integral over time of the voltage pulse of the First Temperature Range Element 120 (determined during the first-half interrogation period at low Reader current amplitude output to the interrogating Antenna) divided by the integral over time of the voltage pulse of the Reference Element 124 (determined during the second-half of the interrogation period at higher Reader current amplitude output to the interrogating Antenna). This Measurable is mapped by the TPC Microwire Reader's firmware to temperature via a third order polynomial that is developed from regression analysis of many runs of many individual microwire temperature sensors throughout the entire temperature measurement range.

These integrals (that are used to generate the Measurable that are used to calculate an exact temperature within Zone One 130) are preferably generated as the average of 10 samples (10 periods of the ramped waveform) of said integrals calculated during a single interrogation period of a temperature measurement. During said temperature measurement, the TPC Microwire Reader 102A-D produces a ramped alternating current (preferably a triangular waveform) of frequency 400 Hz and sends it through one or more Antennae's transmit coils. During the first-half period of each interrogation period, 10 full triangular waveforms generated at the lower current output value will be used to calculate the integrals of its resultant re-magnetization pulses, while 10 more full triangular waveforms generated at the higher current output value will be used to calculate the integrals of its resultant re-magnetization pulses. Averages of the integral values over the 10 samples are then calculated. This interrogation period of magnetic field production, in addition to some transmit/receive overhead and computational overhead, results in a total temperature measurement time of approximately 250 milliseconds when 10 samples are used for each half-interrogation period.

Figure 8:
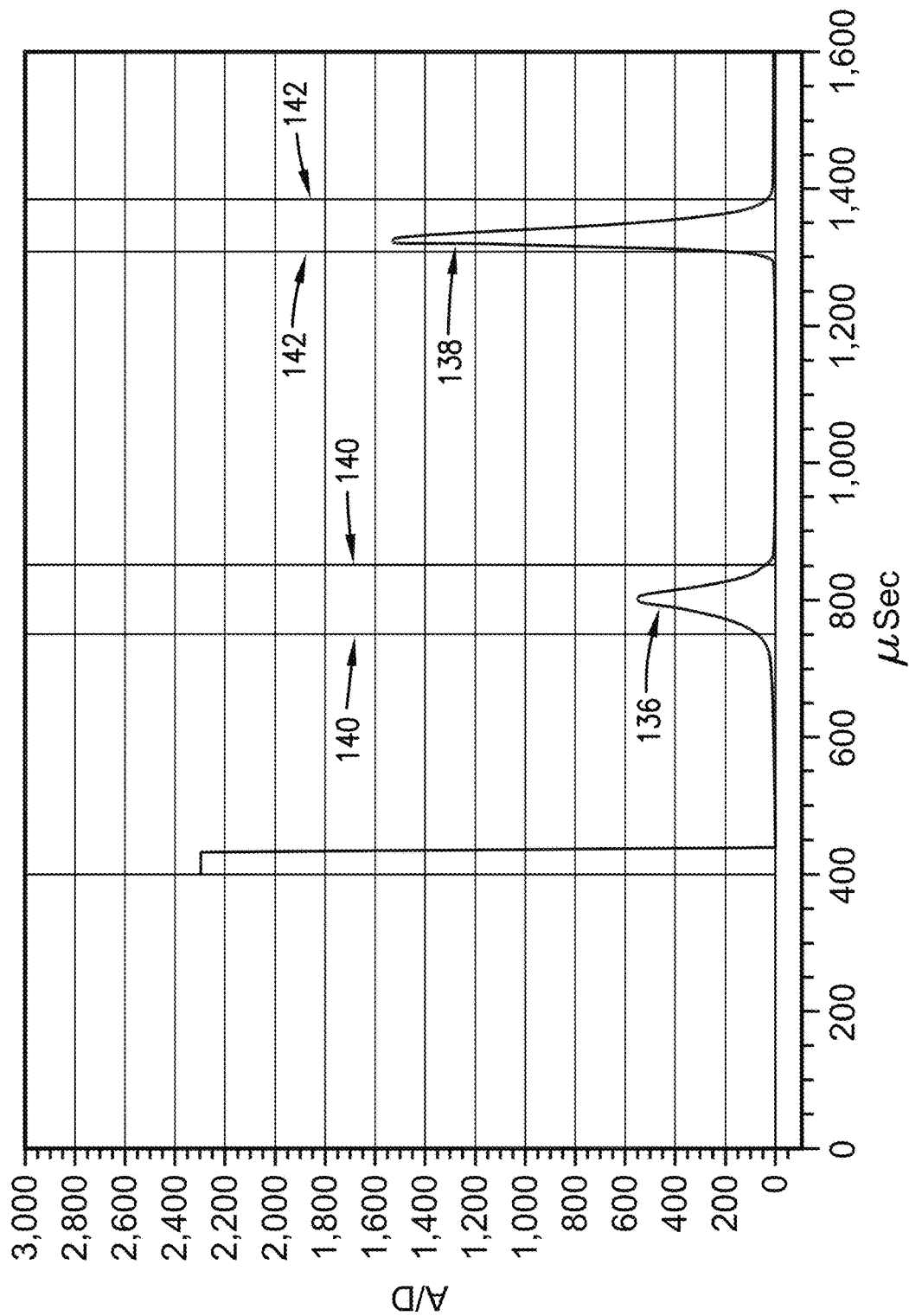
FIG. 8 is a graphical depiction of an interrogation output of an individual sensor of the TPC Microwire Temperature Sensor Assembly.

FIG. 8 shows the resultant re-magnetization pulses from an Individual Microwire Temperature Sensor 108A-D at room temperature (Zone One 130) for one of the 10 ramped waveforms generated at the lower maximum ramp current value. Each re-magnetization pulse used to integrate is generated during one half of the waveform cycle (preferably the increasing ramp portion of the waveform). The Leftmost Pulse 136 is that of the First Temperature Range Element 120, while the Rightmost Pulse 138 is that of the Second Temperature Range Element 122. The Integration Boundaries 140, 142 for their respective pulses are also shown. The lower threshold for integration is the zero-voltage background level, where the Y axis represents the voltage measured on an ND scale. It can be seen that the lower antenna maximum ramp current value has been chosen during the initial calibration procedure to achieve a pulse peak-to-pulse peak distance of at least 400 microseconds for this example. It is also important to note that there are only two re-magnetization pulses generated when the Individual Microwire Temperature Sensor 108A-D is in Zone One 130, despite the fact that three microwire elements are being interrogated. The Reference Element 124 simply does not re-magnetize because the current level has been chosen such that the maximum interrogation magnetic field intensity never reaches a magnitude high enough to cause the polarity of the magnetic domains within the amorphous Reference Element 124 to change. That is, the coercivity of the Reference Element 124 is simply higher than the maximum magnetic field intensity generated during the first half-period of interrogation. For example, the coercivity of the Reference Element 124 may be 60 Nm while the maximum interrogation field intensity during the first half-period ramp may only be 25 Nm (entirely sufficient to re-magnetize the First and Second Temperature Range Elements 120, 122 so as to achieve a sufficient phase time period between re-magnetization pulse centers).

Figure 9:
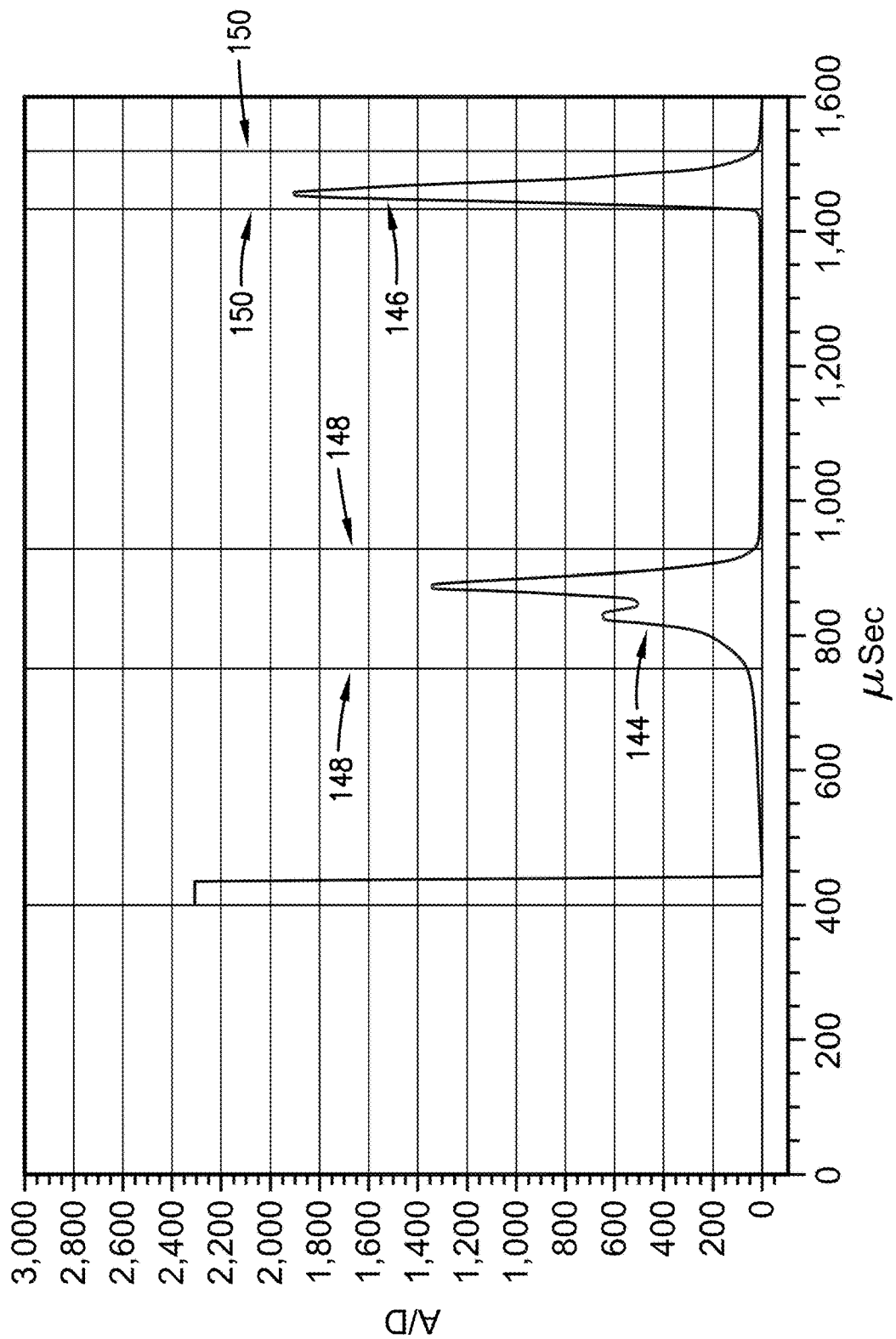
FIG. 9 is a graphical depiction of another interrogation output of an individual sensor of the TPC Microwire Temperature Sensor Assembly.

FIG. 9 shows the resultant re-magnetization pulses from an Individual Microwire Temperature Sensor 108A-D at room temperature (Zone One 130) for one of these 10 ramped waveforms generated at the higher maximum ramp current value. Each re-magnetization pulse used to integrate is generated during one half of the waveform cycle (preferably the increasing ramp portion of the waveform). The Leftmost Pulse 144 is that of a superposition of the re-magnetization pulses of both the First and Second Temperature Range Elements 120, 122. The Rightmost Pulse 146 is the re-magnetization pulse of the Reference Element 124. The Integration Boundaries 148, 150 of the respective pulses are also shown. The lower threshold for integration is the zero-voltage background level, where the Y axis represents the voltage measured on an ND scale. It can be seen that the higher antenna maximum ramp current value has been chosen during the initial calibration procedure to achieve a pulse peak-to-pulse peak distance of at least 400 microseconds for this example. It is also important to note that all three re-magnetization pulses are generated during the second-half interrogation period when the sensor is in Zone One 130. During the second half of the interrogation period, the Reference Element 124 re-magnetizes because the maximum interrogation magnetic field intensity reaches a magnitude high enough to cause the polarity of the magnetic domains within the amorphous Reference Element 124 to change. That is, the coercivity of the Reference Element 124 is lower than the maximum magnetic field intensity generated during this second half-period of interrogation. However, the ramp rate of the magnetic field intensity is so high that both the First Temperature Range Element 120 and the Second Temperature Range Element 122 re-magnetize within a few microseconds of one another. That is, the superposition of voltage in the time domain occurs because the coercivities of the First and Second Temperature Range Elements 120, 122 are so close that the high ramp rate (Δ Field Intensity/Δ time) causes the time phase shift between resultant re-magnetization pulses to be very small—so small that the voltage pulses at least partially overlap in the time domain. The superposition can be noticed visually in FIG. 9 because the Leftmost Pulse 144 looks like a "twin mountain peak." Furthermore, the magnetic field intensity of the second half-period should be chosen to be high enough to allow for a full re-magnetization pulse of the Reference Element 124 to be detected and integrated. In this example, the coercivity of the Reference Element 124 is 60 Nm while the maximum interrogation field intensity during the second half-period ramp is 80 Nm.

By recording the Measurable (ratio of integrals) versus temperature of one or more individual microwire temperature sensors over the range of temperatures from 0 degrees Celsius to a temperature beyond the Curie temperature of First Temperature Range Element 120, a third order polynomial mapping function is generated that is used to correlate the instantaneous Measurable to the sensor temperature while it is in Zone One 130. Furthermore, when the Individual Microwire Temperature Sensor 108A-D (over its entire length) equals the Curie temperature of the First Temperature Range Element 120, the integral of its re-magnetization pulse become zero. Whenever this condition exists, it can be known that the Individual Microwire Temperature Sensor 108A-D is in Zone Two 132. Furthermore, even if the Individual Microwire Temperature Sensor 108A-D is interrogated for the first time by the TPC Microwire Reader 102A-D through its associated TPC Microwire Antenna 104A-D to determine its temperature while being at a temperature greater than the Curie temperature of First Temperature Range Element 120, the fact that only one re-magnetization pulse is detected when using the low current amplitude in the first half of the interrogation period indicates that the Individual Microwire Temperature Sensor 108A-D is in Zone Two 132.

Figure 10:
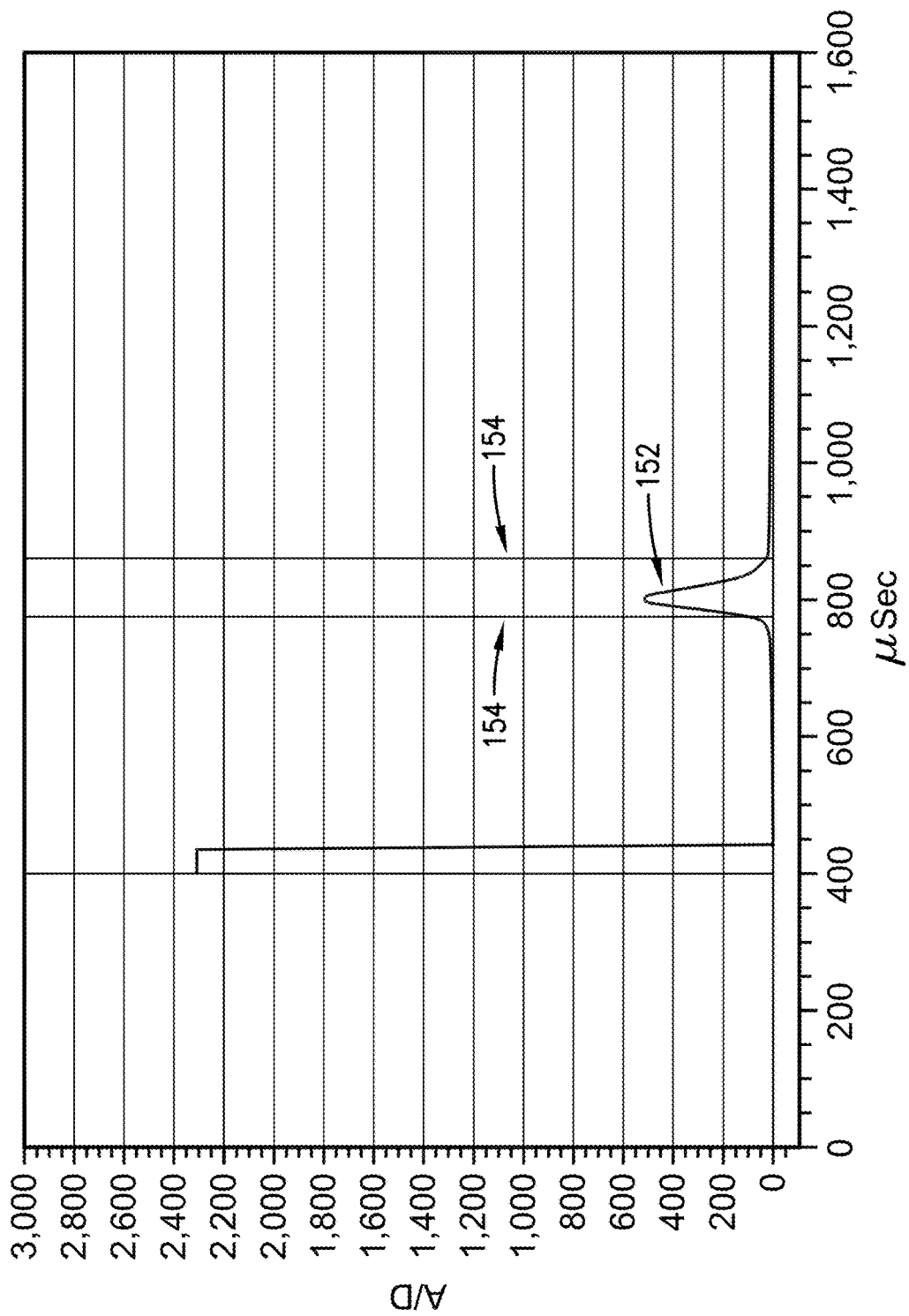
FIG. 10 is a graphical depiction of another interrogation output of an individual sensor of the TPC Microwire Temperature Sensor Assembly.
Figure 11:
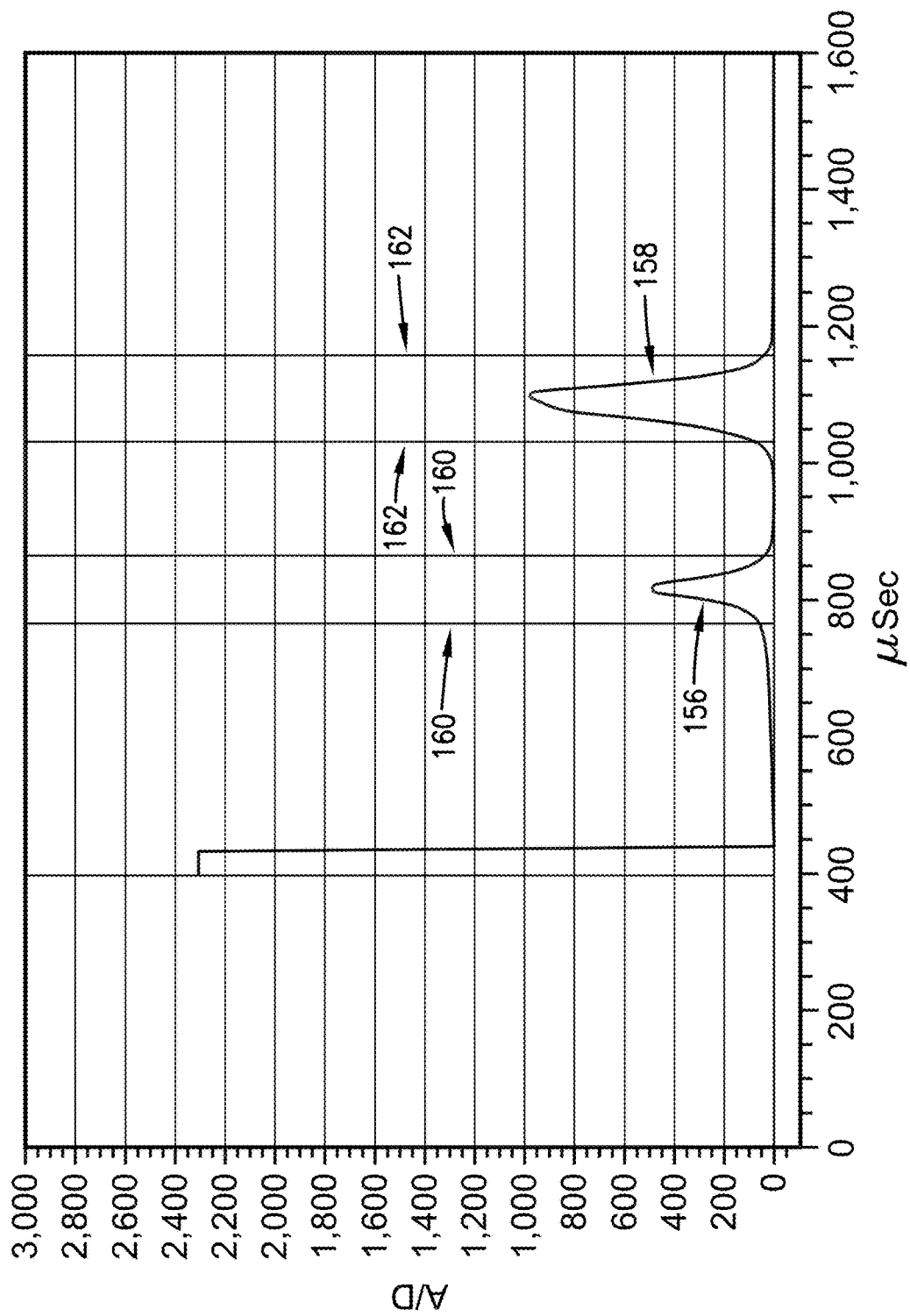
FIG. 11 is a graphical depiction of another interrogation output of an individual sensor of the TPC Microwire Temperature Sensor Assembly.

FIGS. 10 and 11 show the equivalent form of information as was described for FIGS. 8 and 9, respectively. In FIGS. 10 and 11, the Individual Microwire Temperature Sensor 108A-D is in Zone Two 132. Thus, there is only one re-magnetization pulse that is generated during a single ramped AC cycle during the first-half period of interrogation at the low maximum ramp current amplitude. This re-magnetization Pulse 152 is caused by the Second Temperature Range Element 122. The integration boundaries 154 of this Pulse 152 are also shown. In FIG. 11, two re-magnetization pulses are generated during a single ramped AC cycle during the second-half period of interrogation at the higher maximum ramp current amplitude. The Leftmost Pulse 156 is that caused by the re-magnetization of the Second Temperature Range Element 122 alone. The Rightmost Pulse 158 is the re-magnetization pulse of the Reference Element 124. The corresponding integration boundaries 160, 162 are also shown. The lower threshold for integration is the zero-voltage background level, where the Y axis represents the voltage measured on an A/D scale. It can be seen that the higher antenna maximum ramp current amplitude value has been chosen during the initial calibration procedure to achieve a pulse peak-to-pulse peak distance of at least 400 microseconds in this example. It is also important to note that two re-magnetization pulses are generated during the second-half interrogation period when the sensor is in Zone Two 132.

The preferable Measurable of the Individual Microwire Temperature Sensor 108A-D within Zone Two 132 is the integral over time of the voltage pulse of the Second Temperature Range Element 122 (determined either during the first-half interrogation period at low Reader current amplitude output to the interrogating antenna or during the second-half interrogation period at high Reader current amplitude output to the interrogating antenna) divided by the integral over time of the voltage pulse of the Reference Element 124 (determined during the second-half of the interrogation period at higher Reader current amplitude output to the interrogating antenna). This Measurable is mapped by the TPC Microwire Reader's firmware to temperature via a third order polynomial that is developed from regression analysis of many runs of many individual microwire temperature sensors throughout the entire temperature measurement range.

By recording the Measurable (ratio of integrals) versus temperature of one or more individual microwire temperature sensors over the range of temperatures from below the Curie temperature of the First Temperature Range Element 120 to a temperature just below the Curie temperature of the Second Temperature Range Element 122, a third order polynomial mapping function is generated that is used to correlate the instantaneous Measurable to the sensor temperature while the sensor is in Zone Two 132, and for a short range of temperatures just below the Curie temperature of the First Temperature Range Element 120 in Zone One 130. Furthermore, when the Individual Microwire Temperature Sensor 108A-D (over its entire length) experiences a temperature equal to or above the Curie temperature of the First Temperature Range Element 120, the integral of the re-magnetization pulse of the First Temperature Range Element 120 become zero. Whenever this condition exists, it can be known that the Individual Microwire Temperature Sensor 108A-D is in Zone Two 132. Furthermore, even if the Individual Microwire Temperature Sensor 108A-D is interrogated for the first time by the TPC Microwire Antenna 104A-D to determine its temperature while being at a temperature greater than the Curie temperature of Second Temperature Range Element 122, the fact that the TPC Microwire Reader 102A-D or Measurement System Control Computer 112 will detect that there are no re-magnetization pulses when using the low current amplitude in the first half of the interrogation period and only one re-magnetization pulse when using the higher current amplitude in the second half of the interrogation period indicates that the sensor is in Zone Three 134. This condition is not the same as what would occur during a bad read, where such condition is the lack of any re-magnetization pulses in either half of the interrogation period.

Figure 12:
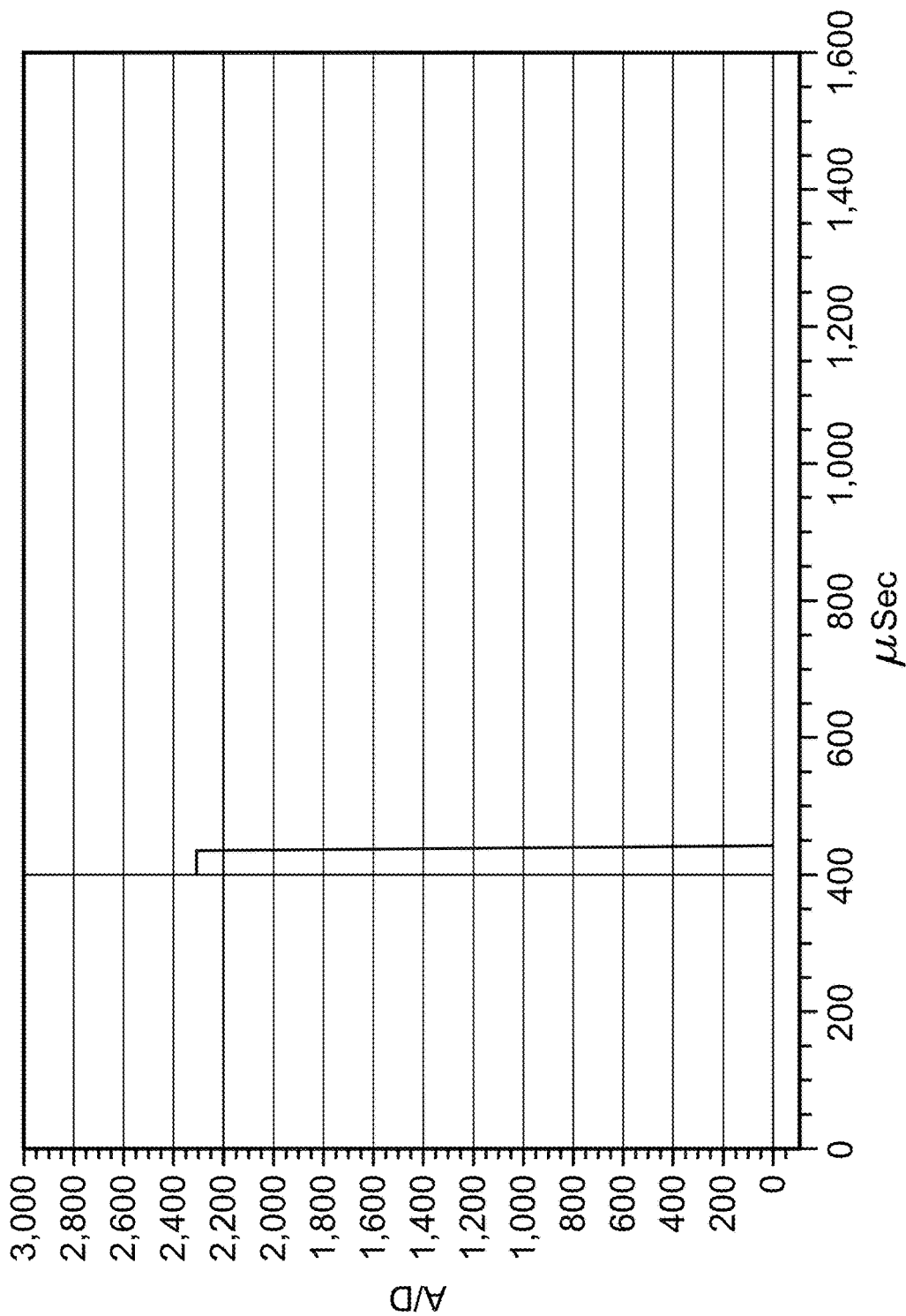
FIG. 12 is a graphical depiction of another interrogation output of an individual sensor of the TPC Microwire Temperature Sensor Assembly.
Figure 13:
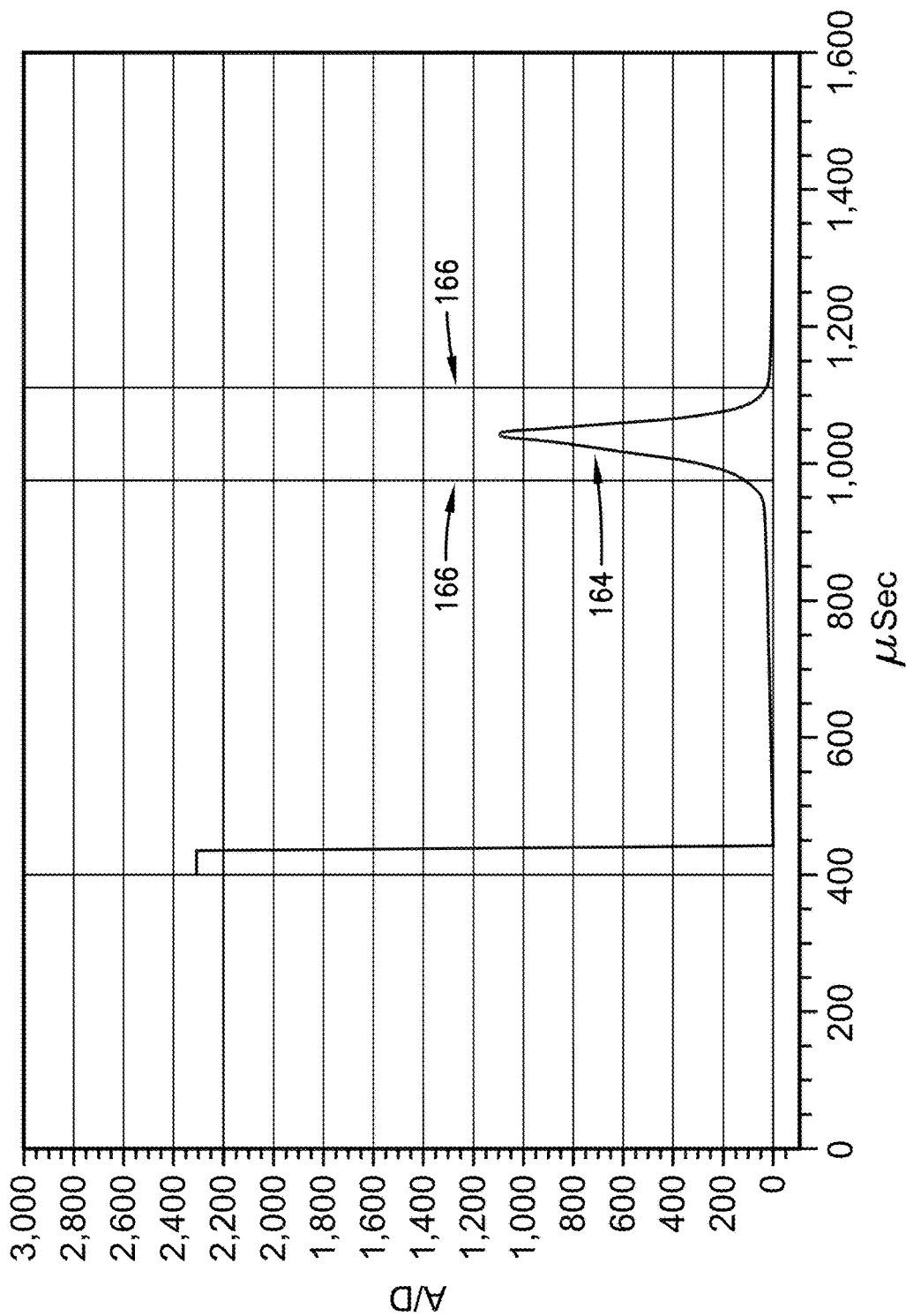
FIG. 13 is a graphical depiction of another interrogation output of an individual sensor of the TPC Microwire Temperature Sensor Assembly.
Figure 14:
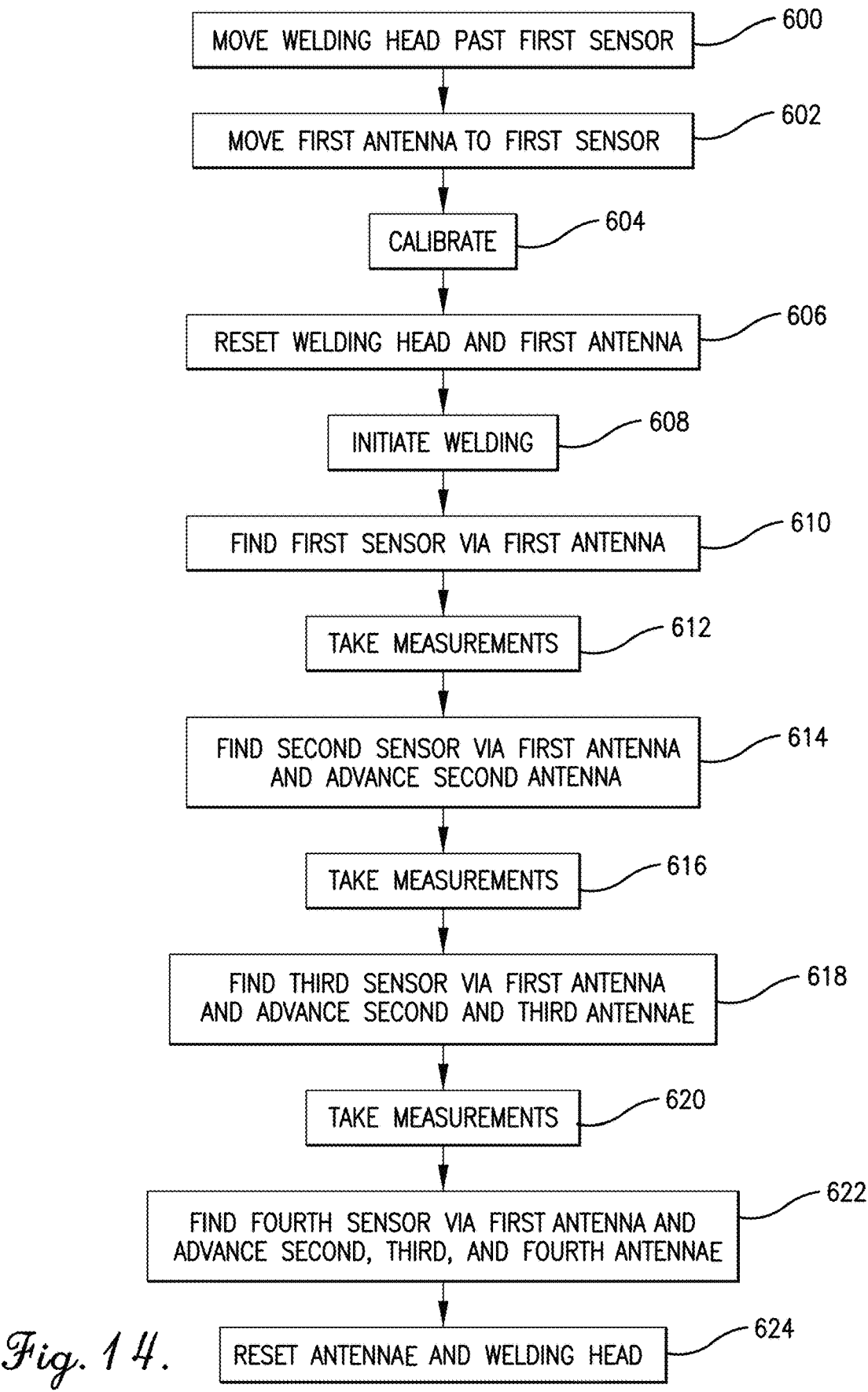
FIG. 14 is a flow diagram of certain method steps in accordance with an embodiment of the invention.

FIGS. 12 and 13 show the equivalent form of information as was described for FIGS. 8 and 9 (and in FIGS. 10 and 11), respectively. In FIGS. 12 and 13, the Individual Microwire Temperature Sensor 108A-D is in Zone Three 134 and thus in FIG. 12 there are no re-magnetization pulses during a single ramped AC cycle during the first-half period of interrogation at the low maximum ramp current amplitude. By the same token, in FIG. 13 there is only one re-magnetization pulse which is generated during a single ramped AC cycle during the second-half period of interrogation at the higher maximum ramp current amplitude. This Pulse 164 is the re-magnetization pulse of the Reference Element 124. The integration boundaries 166 of this Pulse 164 are also shown. The lower threshold for integration is the zero-voltage background level, where the Y axis represents the voltage measured on an ND scale.

Previously, it was discussed that the number of re-magnetization pulse integrals that are used to generate an average, which is used to determine the Measurable that is used to calculate the Individual Microwire Temperature Sensor temperature during a temperature measurement, was 10 (calculated during 10 periods of the ramped waveform). This value of 10 allows the TPC Microwire Reader 102A-D or Measurement System Control Computer 112 to return a temperature value 250 milliseconds after the initiation of a temperature measurement. However, other values of the number of re-magnetization pulse integrals may be used. It should be noted that more integrals used in the average usually result in a more accurate temperature measurement, but always result in a longer temperature measurement time.

It was also previously discussed that the Measurable used within Zone One 130 was the integral over time of the voltage pulse of the First Temperature Range Element 120 (determined during the first-half interrogation period at low Reader current output amplitude to the interrogating antenna) divided by the integral over time of the voltage pulse of the Reference Element 124 (determined during the second-half of the interrogation period at higher Reader current output amplitude to the interrogating antenna). This Measurable is mapped by the TPC Microwire Reader's firmware to temperature via a third order polynomial that is developed from regression analysis of many runs of many individual microwire temperature sensors throughout the entire temperature measurement range. However, it is possible to use an alternative measurable in Zone One 130. The alternative measurable is the same one previously disclosed as being used in Zone Two 132—specifically, the integral over time of the voltage pulse of the Second Temperature Range Element 122 (determined either during the first-half interrogation period at low Reader current amplitude output to the interrogating antenna or during the second-half interrogation period at high Reader current amplitude output to the interrogating antenna) divided by the integral over time of the voltage pulse of the Reference Element 124 (determined during the second-half of the interrogation period at higher Reader current output amplitude to the interrogating antenna). This Measurable is mapped by the TPC Microwire Reader's firmware to temperature via a third order polynomial that is developed from regression analysis of many runs of many individual microwire temperature sensors throughout the entire temperature measurement range.

The advantage in using this alternative measurable is that there will be no instantaneous temperature deviation at the Curie temperature of the First Temperature Range Element 120 as is the case when using the preferred Measurable. The disadvantage of using this alternative Measurable is that during Zone One 130 the Individual Microwire Temperature Sensor 108A-D is farther from the Curie temperature of the Second Temperature Range Element 122 used in the measurable.

Turning now to FIGS. 14-20, a sample operation of the TPC Welding Microwire Temperature Measurement System 100 with the TPC Welding System 200, from TPC Initial Calibration until four TPC Microwire Antennae 104A-D are in proper position to make continuous, accurate temperature measurements of four Individual Microwire Temperature Sensors 108A-D of a TPC Microwire Temperature Sensor Assembly 106 placed within the weld line will be described in more detail.

It should be noted that a single Motorized Linear Stage 114 moves all four TPC Microwire Antennae 104A-D. The following discussion holds true for the operation of a rail system that has four individual motorized linear stages each with a single TPC microwire antenna that are linked electronically.

It should also be noted that the Measurement System Control Computer 112 must have access to position information of the Welding Head 208 throughout the duration of the welding operation. This position information is preferably a simple linear position coordinate provided by the induction Welder Control Computer 214 to the electronically-linked Measurement System Control Computer 112 but could also be starting time and speed information of the Welding Head 208 provided by the induction Welder Control Computer 214 to the electronically-linked Measurement System Control Computer 112. Another option to access the position information of the Welding Head 208 is to install optical sensors or capacitive sensors on the Rail System 110. Regardless, for clarity of discussion, consider that the Measurement System Control Computer 112 has knowledge, at all times, of the linear position of the Welding Head 208. Consider, for discussion, that the Measurement System Control Computer 112 is linked electronically with the Welding System Computer 214. Furthermore, consider that the Measurement System Control Computer 112 is also managing the TPC Microwire Readers 102A-D and controlling movement of the TPC Microwire Antennae 104A-D.

Before the first welding process of two parts or any number of subsequent welding processes of the same two example parts can begin, the technician unrolls a length of uncut TPC microwire temperature sensor strip from a square bobbin that comprises four Individual Microwire Temperature Sensors 108A-D. The technician can see the marked location of the four embedded Individual Microwire Temperature Sensors 108A-D and thus knows where to cut the neat resin strip. Once cut, the neat resin strip is placed along the center of, and within the weld line such that the neat strip is aligned along the path of motion of the welding head's attached Work Coil 210.

The next step is accomplished only once but must be done before all subsequent welding processes are initiated to achieve accurate temperature measurements of the four Individual Microwire Temperature Sensors 108A-D. This next step is the TPC Initial Calibration that was introduced previously. To initiate the TPC Initial Calibration process, the technician will input the "TPC Initial Calibration" command into the user interface of the Measurement System Control Computer 112. At this point, the Measurement System Control Computer 112 will issue a command to the induction Welder Control Computer 214 to move the Welding Head 208 down the tool path to a position at the end of the tool path line, as shown in block 600. This change of position of the Welding Head 208 will remove it from the path between the four TPC Microwire Antennae 104A-D and at least the first of the four Individual Microwire Temperature Sensors 108A-D in the welding head's path down the tool path.

Figure 15:
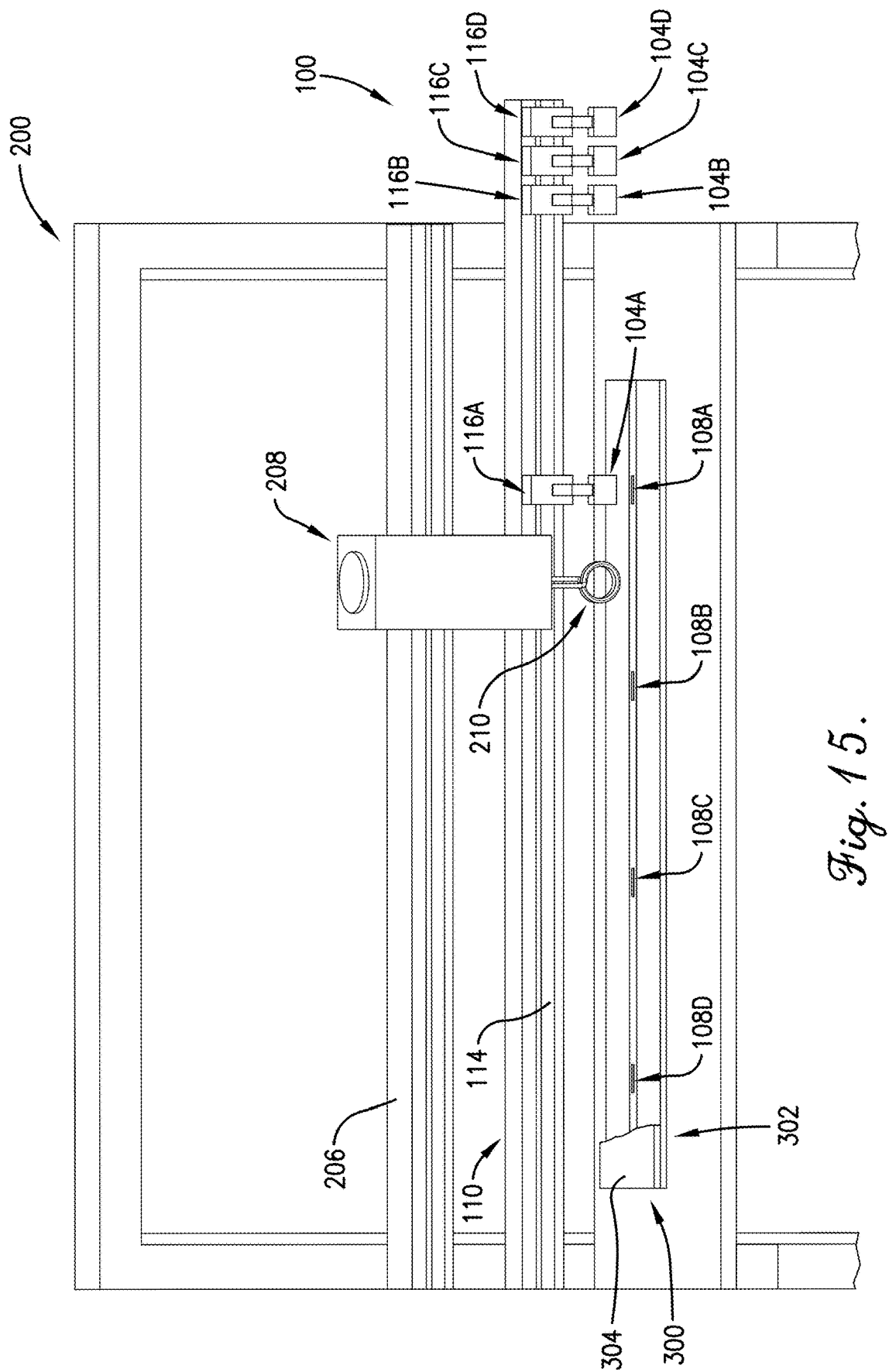
FIG. 15 is a front perspective view of the TPC Welding System and TPC Welding Microwire Temperature Measurement System in a calibration configuration.

At this point the TPC Microwire Antenna 104A closest to the beginning of the tool path will move toward the first Individual Microwire Temperature Sensor 108A in its path, as shown in block 602. The Measurement System Control Computer 112 (also controlling the TPC Microwire Antenna 102A) will at this point utilize a slightly-modified version of the "Sensor-Finding" algorithm to drive the TPC Microwire Antenna 104A closest to the beginning of the tool path into a position directly over the center point of the first Individual Microwire Temperature Sensor 108A in its path. Four modified variables in the "Sensor-Finding" method (as previously introduced) are hard-coded to be used only when the "TPC Initial Calibration" command is executed. These four modified variables are: a slower "fast speed" (preferably now 20 mm/second) of the Driven Carriage 116A and its attached first TPC Microwire Antenna 104A, a slower "slow speed" (preferably now 5 mm/second) of the Driven Carriage 116A and its attached first TPC Microwire Antenna 104A, a pre-selected, hard-coded value (derived from laboratory tests) of the "low" maximum current ramp amplitude to be driven through the transmit coil of the first TPC Microwire Antenna 104A being moved during the "fast speed" phase, and a pre-selected, hard-coded value (derived from laboratory tests) of the "high" maximum current ramp amplitude to be driven through the transmit coil of the first TPC Microwire Antenna 104A being moved during the "low speed" phase. These four modified values of the parameters used in the previously described "Sensor-Finding" method allow the Rail System 110 to automatically place the center of the long axis of the first TPC Microwire Antenna 104A to a position directly over the center point of the first Individual Microwire Temperature Sensor 108A within +/−1 mm. FIG. 15 shows a TPC Initial Calibration process configuration.

Figure 16:
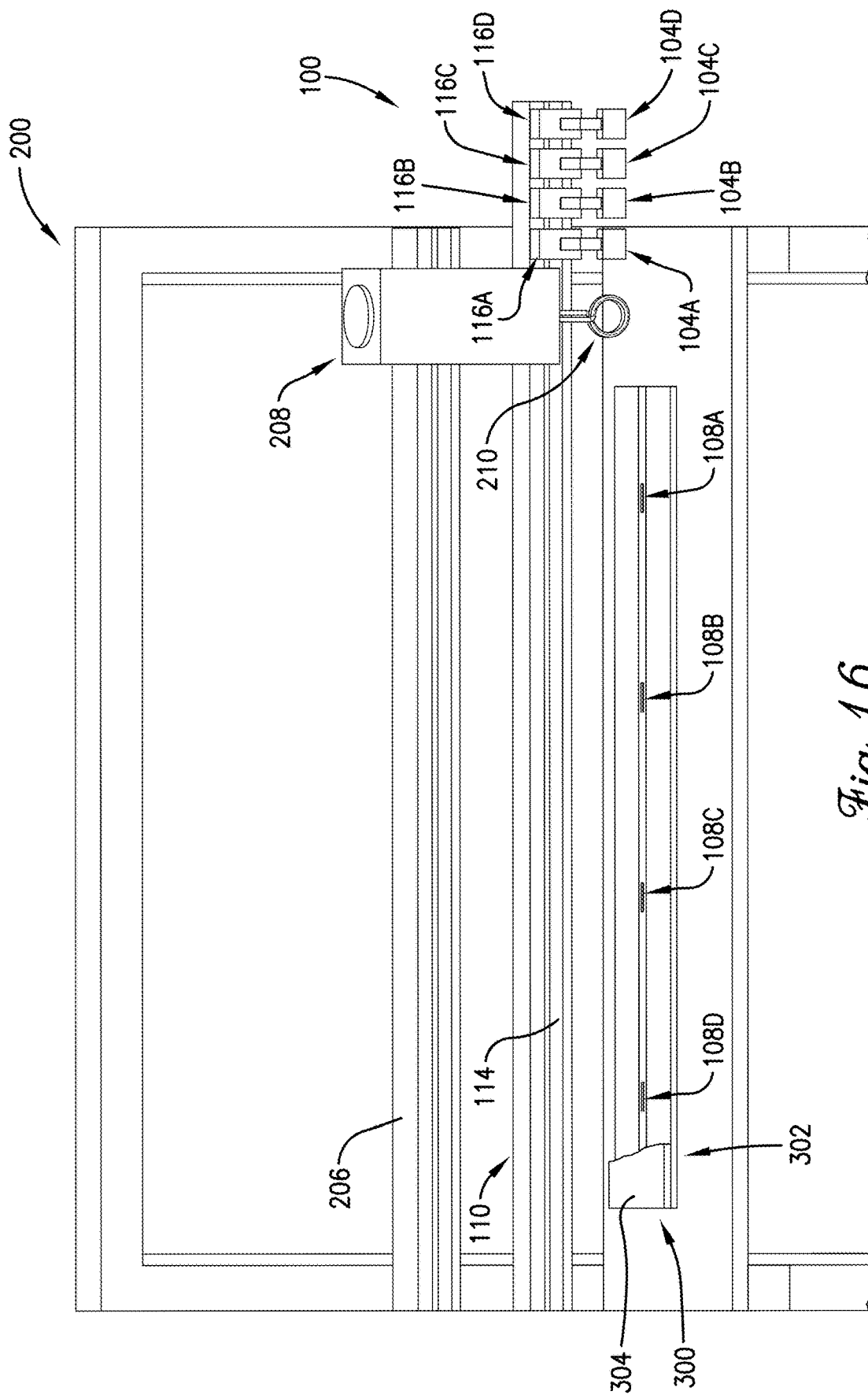
FIG. 16 is a front perspective view of the TPC Welding System and TPC Welding Microwire Temperature Measurement System in an initial configuration.

At this time, the Measurement System Control Computer 112 directs the TPC Microwire Reader 102A to execute the TPC Initial Calibration Process, whereby the actual "low" and "high" values of the maximum AC ramp current amplitude are determined for use in all interrogations made during the welding process, as shown in block 604. Once the TPC Initial Calibration Process is completed, the Measurement System Control Computer 112 directs the Motorized Linear Stage 114 to move the First TPC Microwire Antenna 104A back to its original position adjacent the other three TPC Microwire Antennae 104B-C at the edge of the tool path, as shown in block 606. Furthermore, the Measurement System Control Computer 112 directs the Welding System Computer 214 to move the Welding Head 208 back to its original position where it is ready to start a welding operation, as shown in FIG. 16.

At this point, the TPC Welding System 200 and the TPC Welding Microwire Temperature Measurement System 100 are ready for the first welding operation to commence. The technician will input the "Weld" command into the Rail System Control Computer's user interface. After this command is issued, all motions and function executions of the TPC Welding Microwire Temperature Measurement System 100 during the entire welding operation are completed automatically, without further technician input. The TPC Welding System 200 waits for the technician to initiate a welding operation via the user input of the welding system's computer before it executes all of the actions described below.

Once the welding operation has commenced (block 608), the Welding Head 208 begins to move down the tool path. Once the Welding Head 208 has passed the position of the First Individual Microwire Temperature Sensor 108A the Measurement System Control Computer 112 directs the Rail System 110 to execute the "Sensor-Finding" process with First TPC Microwire Antenna 104A. It is important to understand that only the First TPC Microwire Antenna 104A will ever be used to execute the "Sensor-Finding" process. All other TPC Microwire Antennae 104B-D will be moved into positions over Individual Microwire Temperature Sensors 108A-C by the Measurement System Control Computer 112 to the exact linear positions of said sensors that have been discovered by the Measurement System Control Computer 112 when using the "Sensor-Finding" process with First TPC Microwire Antenna 104A. These sensor positions are stored by the Measurement System Control Computer 112 during each welding operation. The ability of the Motorized Linear Stage 114 to move to exact linear positions along its length allows all motions of the Second, Third, and Fourth TPC Microwire Antennae 104B-D during the welding operation (after the TPC Initial Calibration process has been completed) to be at the fastest possible speed (preferably at least 125 mm/second).

Figure 17:
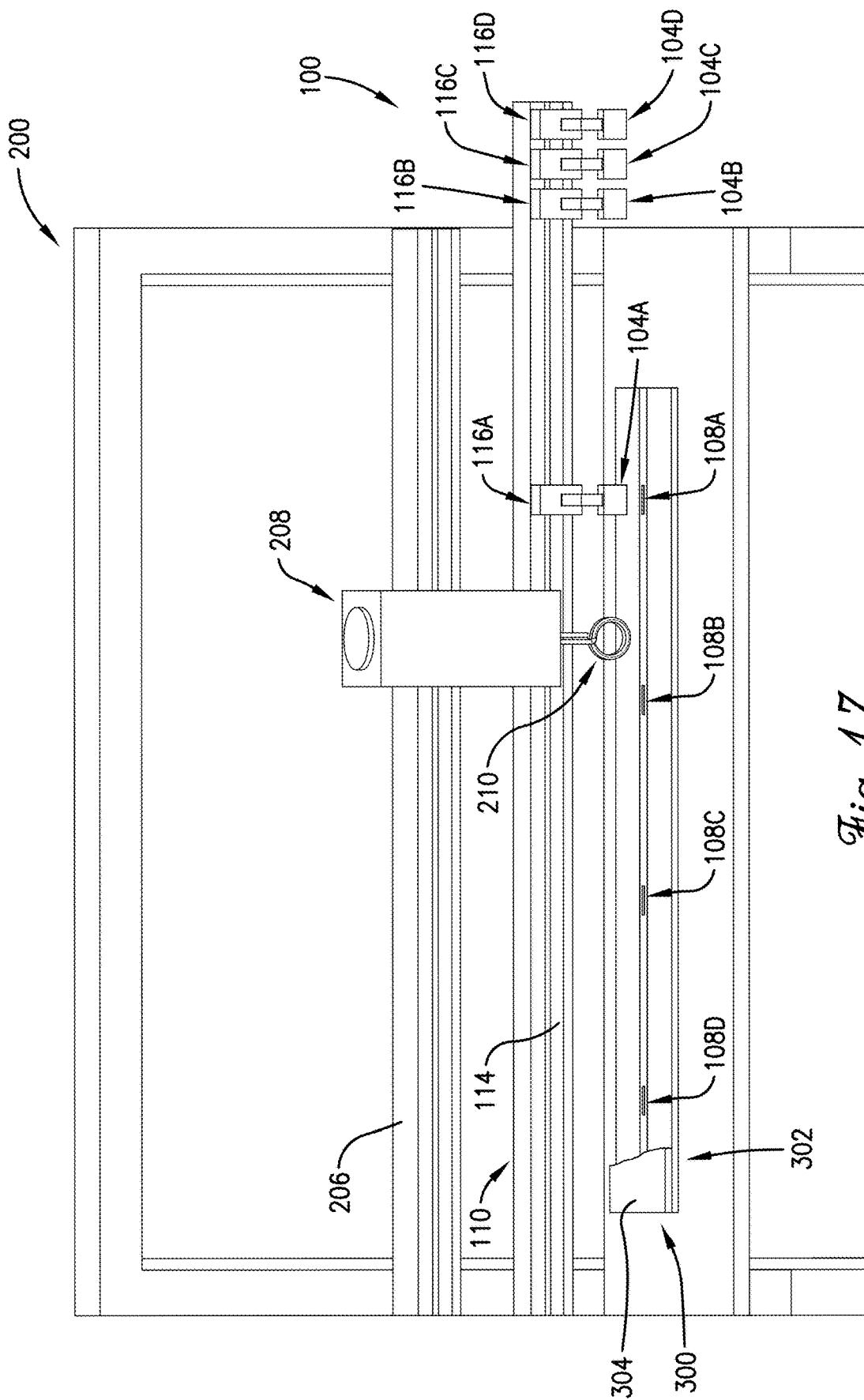
FIG. 17 is a front perspective view of the TPC Welding System and TPC Welding Microwire Temperature Measurement System in a first sensing configuration.

In FIG. 17, the First TPC Microwire Antenna 104A is in proper position for the temperature measurement of First Individual Microwire Temperature Sensor 108A, as shown in block 610. Note that the Welding Head 208 has just passed the position of the First Individual Microwire Temperature Sensor 108A and is moving from right to left. At this point, the Measurement System Control Computer 112 directs the TPC Microwire Reader 102A, via the TPC Microwire Antenna 104A, to make continuous temperature measurements of the First Individual Microwire Temperature Sensor 108A, as shown in block 612. These temperature measurements are made at approximately 250 millisecond intervals. All Individual Microwire Temperature Sensor temperatures measured are logged by the Measurement System Control Computer 112.

The Welding Head 208 continues to move, and once the Welding Head 208 has passed the position of the Second Individual Microwire Temperature Sensor 108B, the Measurement System Control Computer 112 directs the Rail System 110 to execute the "Sensor-Finding" process with First TPC Microwire Antenna 10A this time to find the Second Individual Microwire Temperature Sensor 108B, as shown in block 614. Once the position of the Second Individual Microwire Temperature Sensor 108B is found, the First TPC Microwire Antenna 104A and its associated TPC Microwire Reader 102A begin to make continuous temperature measurements of the Second Individual Microwire Temperature Sensor 108B, as shown in block 616. Simultaneously, the Measurement System Control Computer 112 directs the Rail System 110 to move the Second TPC Microwire Antenna 104B to the exact previously determined position of the First Individual Microwire Temperature Sensor 108A (at 125 mm/second speed), and its associated TPC Microwire Reader 102B begins to allow continuous temperature measurements to be made of the First Individual Microwire Temperature Sensor 108A.

Figure 18:
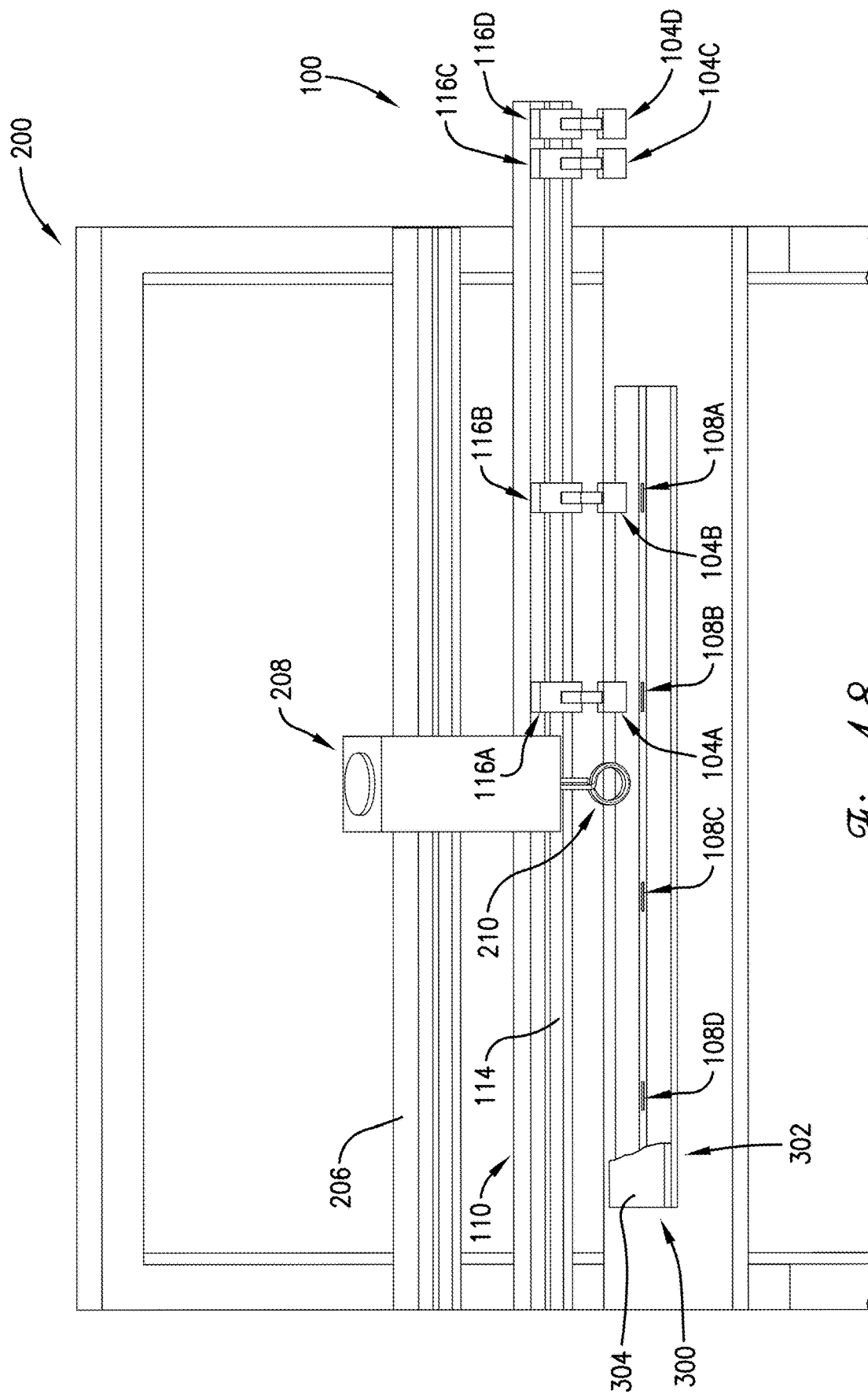
FIG. 18 is a front perspective view of the TPC Welding System and TPC Welding Microwire Temperature Measurement System in a second sensing configuration.

In FIG. 18, the First and Second TPC Microwire Antennae 104A,B are in position for the temperature measurement of the First and Second Individual Microwire Temperature Sensors 108A,B. Note that the Welding Head 208 has just passed the position of the Second Individual Microwire Temperature Sensor 108B and is moving from right to left. The First TPC Microwire Antenna 104A has been used to locate the positions of both the First and Second Individual Microwire Temperature Sensors 108A,B via the Rail System's "Sensor-Finding" method. The Second TPC Microwire Antenna 104B has been sent by the Measurement System Control Computer 112 directly to the position of the center point of the First Individual Microwire Temperature Sensor 108A where said position was determined and memorized via use of the "Sensor-Finding" method and the positioning knowledge provided by the Motorized Linear Stage 114.

The Welding Head 208 continues to move, and once the Welding Head 208 has passed the position of the Third Individual Microwire Temperature Sensor 108C, the Measurement System Control Computer 112 directs the Rail System 110 to execute the "Sensor-Finding" process with the First TPC Microwire Antenna 104A, this time to find the Third Individual Microwire Temperature Sensor 108C, as shown in block 618. Once the position of the Third Individual Microwire Temperature Sensor 108C is found, the First TPC Microwire Antenna 104A and its associated TPC Microwire Reader 102A begin to make continuous temperature measurements, as shown in block 620. Simultaneously, the Measurement System Control Computer 112 directs the Rail System 110 to move the Second TPC Microwire Antenna 104B to the exact previously determined position of the Second Individual Microwire Temperature Sensor 108B (at 125 mm/second speed) and its associated TPC Microwire Reader 102B begins to make continuous temperature measurements. Furthermore, the Measurement System Control Computer 112 also simultaneously directs the Rail System 110 to move the Third TPC Microwire Antenna 104C to the exact previously determined position of the First Individual Microwire Temperature Sensor 108A (at 125 mm/second speed) and its associated TPC Microwire Reader 102C begins to make continuous temperature measurements of the First Individual Microwire Temperature Sensor 108A.

Figure 19:
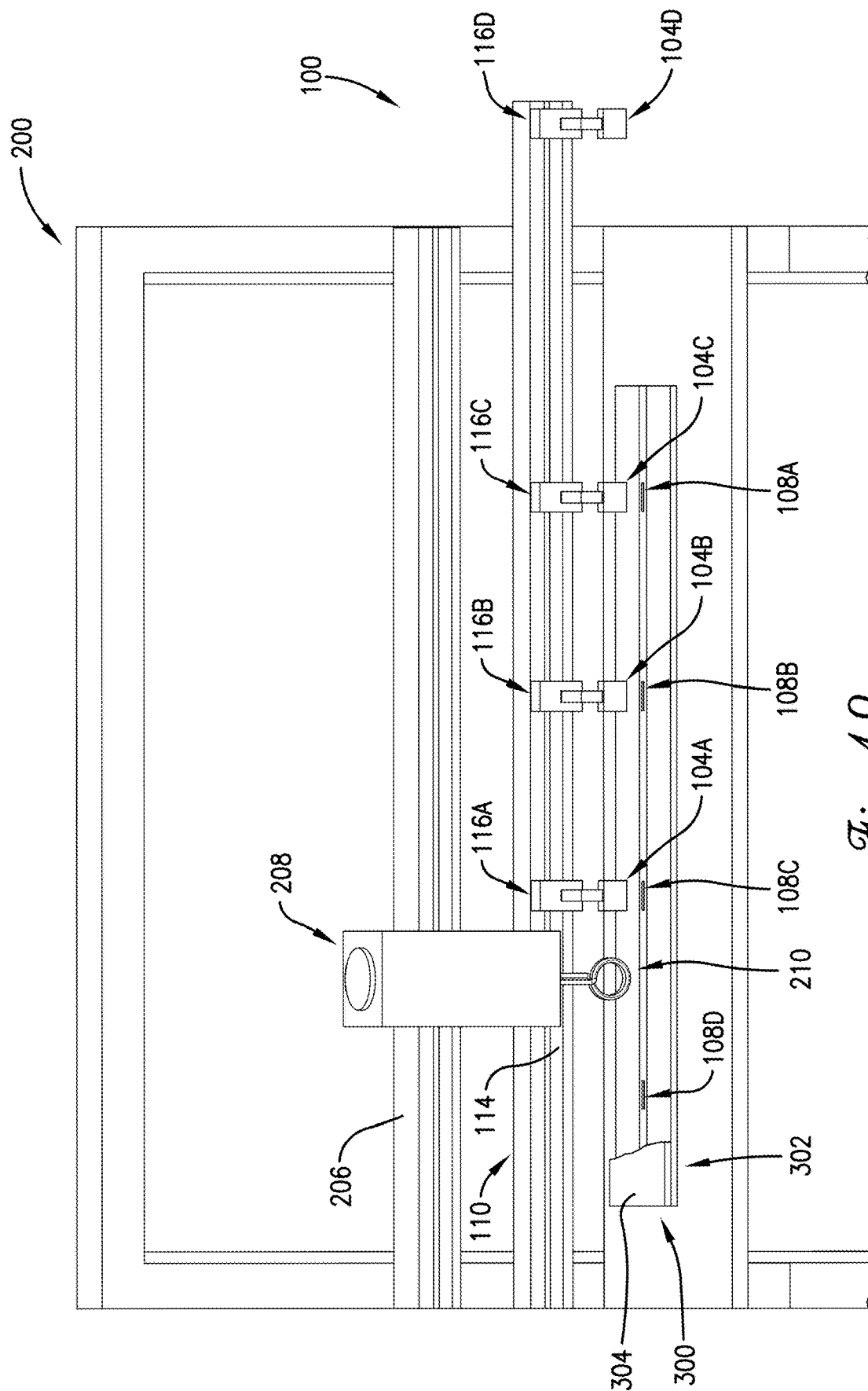
FIG. 19 is a front perspective view of the TPC Welding System and TPC Welding Microwire Temperature Measurement System in a third sensing configuration.

In FIG. 19, the First, Second, and Third TPC Microwire Antennae 104A-C are in position for the temperature measurement of the First, Second, and Third Individual Microwire Temperature Sensors 108A-C. Note that the Welding Head 208 has just passed the position of the Third Individual Microwire Temperature Sensor 108C and is moving from right to left. The First TPC Microwire Antenna 104A has been used to locate the positions of each of the First, Second, and Third Individual Microwire Temperature Sensors 108A-C via the Rail System's "Sensor-Finding" method. The Second TPC Microwire Antenna 104B has been sent by the Measurement System Control Computer 112 directly to the position of the center point of the Second Individual Microwire Temperature Sensor 108B where said position was determined and memorized via use of the "Sensor- Finding" method and the positioning knowledge provided by the Motorized Linear Stage 114. The Third TPC Microwire Antenna 104C has been sent by the Measurement System Control Computer 112 directly to the position of the center point of the First Individual Microwire Temperature Sensor 108A where said position was determined and memorized via use of the "Sensor-Finding" method and the positioning knowledge provided by the Motorized Linear Stage 114.

The Welding Head 208 continues to move, and once the Welding Head 208 has passed the position of the Fourth Individual Microwire Temperature Sensor 108D, the Measurement System Control Computer 112 directs the Rail System 110 to execute the "Sensor-Finding" process with the First TPC Microwire Antenna 104A, this time to find the Fourth Individual Microwire Temperature Sensor 108D, as shown in block 622. Once the position of the Fourth Individual Microwire Temperature Sensor 108D is found, the First TPC Microwire Antenna 104A and its associated TPC Microwire Reader 102A begins to make continuous temperature measurements of Individual Microwire Temperature Sensor 108D, as shown in block 624. Simultaneously, the Measurement System Control Computer 112 directs the Rail System 110 to move the Second TPC Microwire Antenna 104B to the exact previously determined position of the Third Individual Microwire Temperature Sensor 108C (at 125 mm/second speed) and its associated TPC Microwire Reader 102B begins to make continuous temperature measurements. Furthermore, the Measurement System Control Computer 112 also simultaneously directs the Rail System 110 to move the Third TPC Microwire Antenna 104C to the exact previously determined position of the Second Individual Microwire Temperature Sensor 108B (at 125 mm/second speed) and its associated TPC Microwire Reader 102C begins to make continuous temperature measurements. Finally, simultaneously to the other TPC Microwire Antennae 104A-C movement, the Measurement System Control Computer 112 also simultaneously directs the Rail System 110 to move the Fourth TPC Microwire Antenna 104D to the exact previously determined position of the First Individual Microwire Temperature Sensor 108A (at 125 mm/second speed) and its associated TPC Microwire Reader 102D begins to make continuous temperature measurements.

Figure 20:
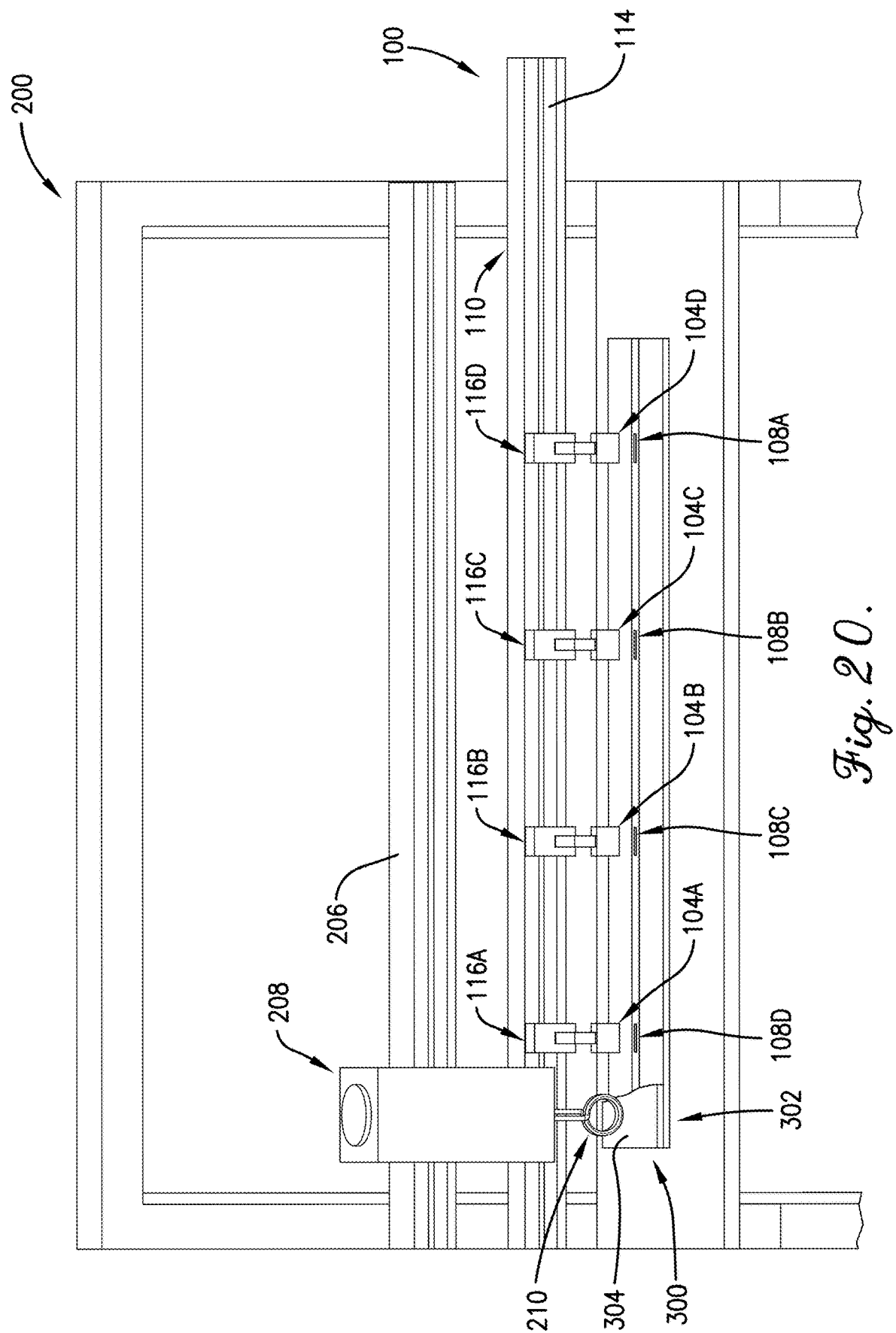
FIG. 20 is a front perspective view of the TPC Welding System and TPC Welding Microwire Temperature Measurement System in a fourth sensing configuration.

In FIG. 20, the First, Second, Third, and Fourth TPC Microwire Antennae 104A-D are in position for the temperature measurement of the First, Second, Third, and Fourth Individual Microwire Temperature Sensors 108A-D. Note that the Welding Head 208 has just passed the position of the Fourth Individual Microwire Temperature Sensor 108D and is moving from right to left. The First TPC Microwire Antenna 104A has been used to locate the positions of all of the Individual Microwire Temperature Sensors 106A-D via the Rail System's "Sensor-Finding" method. The Second TPC Microwire Antenna 104b has been sent by the Measurement System Control Computer 112 directly to the position of the center point of the Third Individual Microwire Temperature Sensor 108C where said position was determined and memorized via use of the "Sensor-Finding" method and the positioning knowledge provided by the Motorized Linear Stage 114. The Third TPC Microwire Antenna 104C has been sent by the Measurement System Control Computer 112 directly to the position of the center point of the Second Individual Microwire Temperature Sensor 108B where said position was determined and memorized via use of the "Sensor-Finding" method and the positioning knowledge provided by the Motorized Linear Stage 114. The Fourth TPC Microwire Antenna 104D has been sent by the Measurement System Control Computer 112 directly to the position of the center point of the First Individual Microwire Temperature Sensor 108A where said position was determined and memorized via use of the "Sensor-Finding" method and the positioning knowledge provided by the Motorized Linear Stage 114.

At this point, all four TPC Microwire Antennae 104A-D continue to allow the TPC Microwire Readers 102A-D to make continuous temperature measurements every 250 milliseconds until the technician decides to stop the "Weld" command operation. All temperature measurements made before this stop command is issued are logged and saved in a file by the Measurement System Control Computer 112. Furthermore, all temperature measurements are made available to the Welder Control Computer 214 for use in controlling the speed of the Welding Head 208 and current output to Induction Work Coil 210 so as to achieve proper weld temperatures at all locations for the proper amount of time. It is possible for the Measurement System Control Computer 112 to work in conjunction with the Welder Control Computer 214 to back up the motion of the Welding Head 208 in concert with backing up one or more TPC Microwire Antennae 104A-D so that re-heating of a given section of the Parts 302, 304 to be welded can be done during the welding process. If this is done, the Measurement System Control Computer 112 can again use the stored positions and positioning knowledge provided by the Motorized Linear Stage 114 to quickly move any number of TPC Microwire Antennae 104A-D back over any uncovered Individual Microwire Temperature Sensors 108A-D (uncovered by moving the TPC Microwire Antennae 104A-D out of the way of the Welding Head 208 so as to accomplish a re-heat) to continue making temperature measurements and validate that the reheat was successful. In all cases, the final position, even after a re-heat, of all TPC Microwire Antennae 104A-D should be that of FIG. 20 until the technician executes a final stop of the "Weld" function.

Once the "Weld" function is stopped by the technician, all four TPC Microwire Antennae 104A-D may move back into the starting position (i.e., FIG. 16). The welding system's Control Computer will then move the Welding Head 208 back into the starting position as well. No new TPC Initial Calibration process is required before any subsequent welding operation with new parts (including a new TPC microwire temperature sensor) placed within the weld line, can commence. The technician simply executes a "Weld" function command to repeat the Rail System motions and temperature measurement and control process described above.

Figure 21:
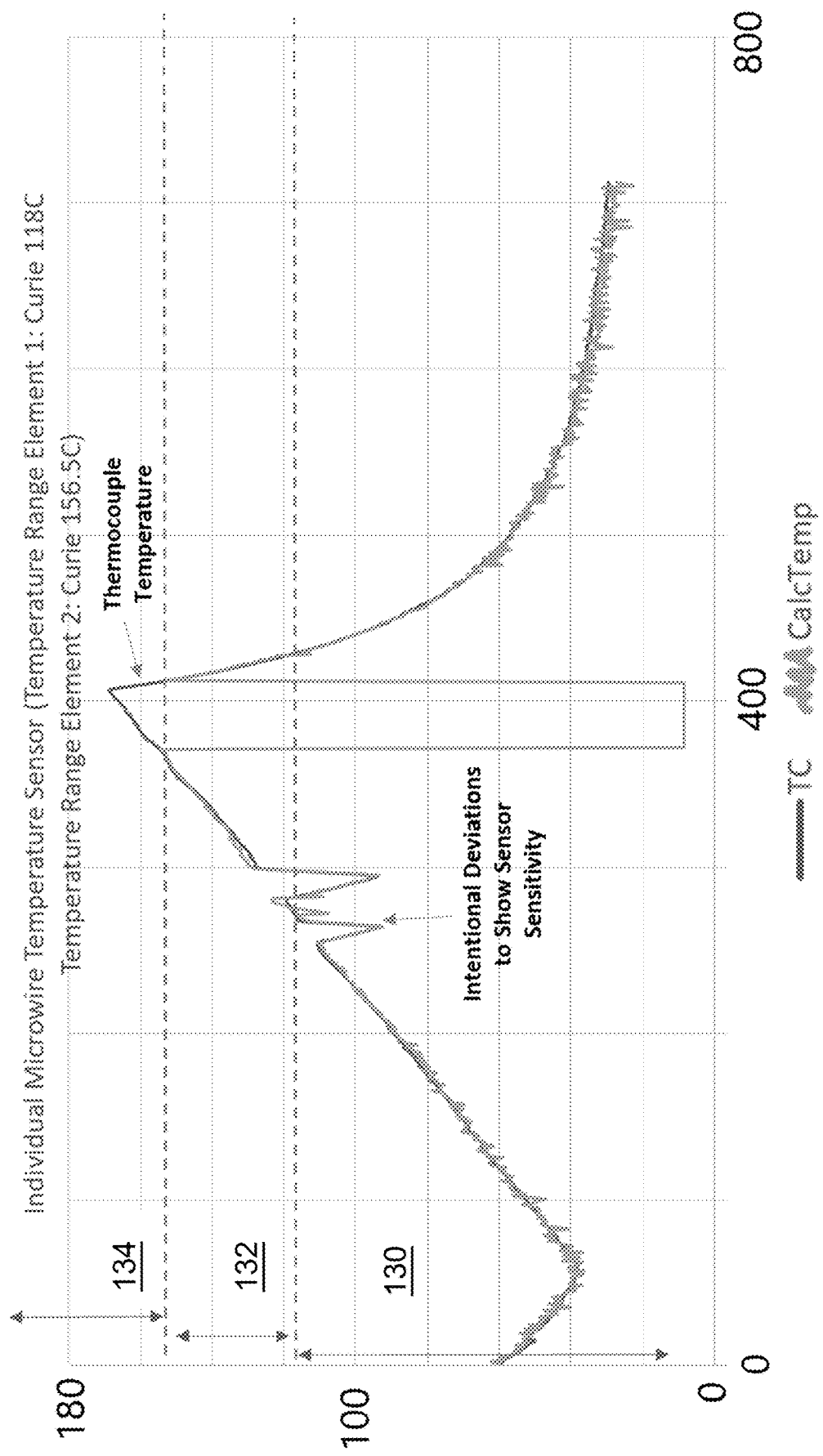
FIG. 21 is a graph showing exemplary temperature accuracy achieved by the TPC Welding Microwire Temperature Measurement System in accordance with an embodiment of the invention.

FIG. 21 is a graph showing the temperature accuracy achieved by the TPC Welding Microwire Temperature Measurement System 100 of this invention during the heating of an Individual Microwire Temperature Sensor 108 embedded within the center ply of a thin, 7 ply, thermoset composite panel. Also embedded within the same center ply was a thermocouple adjacent to the Individual Microwire Temperature Sensor 108 for comparison. The Individual Microwire Temperature Sensor 108 used during this heating operation had a First Temperature Range Element 120 with a Curie temperature of 118.0 degrees Celsius and a Second Temperature Range Element 122 with a Curie temperature of 156.5 Celsius. The temperature accuracy of this particular Individual Microwire Temperature Sensor 108, relative to the adjacent thermocouple, within all three zones (Zone One 130, Zone Two 132, and Zone Three 134) can be seen. Note that the temperature accuracy of the Individual Microwire Temperature Sensor 108 (relative to the thermocouple) in Zone Two 132 is superior to that in Zone One 130. The Individual Microwire Temperature Sensor's temperature fluctuates much more when the Individual Microwire Temperature Sensor 108 is in Zone One 130, and said fluctuations are greater at 40 degrees Celsius that at 100 degrees Celsius within Zone One 130. This is due to the (Δ measurable/Δ temperature) of the measurable being lower the further away the sensor is from its measureable's Temperature Range Element Curie temperature.

ADDITIONAL CONSIDERATIONS

Throughout this specification, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the current invention can include a variety of combinations and/or integrations of the embodiments described herein.

Although the present application sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as computer hardware that operates to perform certain operations as described herein.

In various embodiments, computer hardware, such as a processing element, may be implemented as special purpose or as general purpose. For example, the processing element may comprise dedicated circuitry or logic that is permanently configured, such as an application-specific integrated circuit (ASIC), or indefinitely configured, such as an FPGA, to perform certain operations. The processing element may also comprise programmable logic or circuitry (e.g., as encompassed within a general-purpose processor or other programmable processor) that is temporarily configured by software to perform certain operations. It will be appreciated that the decision to implement the processing element as special purpose, in dedicated and permanently configured circuitry, or as general purpose (e.g., configured by software) may be driven by cost and time considerations.

Accordingly, the term "processing element" or equivalents should be understood to encompass a tangible entity, be that an entity that is physically constructed, permanently configured (e.g., hardwired), or temporarily configured (e.g., programmed) to operate in a certain manner or to perform certain operations described herein. Considering embodiments in which the processing element is temporarily configured (e.g., programmed), each of the processing elements need not be configured or instantiated at any one instance in time. For example, where the processing element comprises a general-purpose processor configured using software, the general-purpose processor may be configured as respective different processing elements at different times. Software may accordingly configure the processing element to constitute a particular hardware configuration at one instance of time and to constitute a different hardware configuration at a different instance of time.

Computer hardware components, such as communication elements, memory elements, processing elements, and the like, may provide information to, and receive information from, other computer hardware components. Accordingly, the described computer hardware components may be regarded as being communicatively coupled. Where multiple of such computer hardware components exist contemporaneously, communications may be achieved through signal transmission (e.g., over appropriate circuits and buses) that connect the computer hardware components. In embodiments in which multiple computer hardware components are configured or instantiated at different times, communications between such computer hardware components may be achieved, for example, through the storage and retrieval of information in memory structures to which the multiple computer hardware components have access. For example, one computer hardware component may perform an operation and store the output of that operation in a memory device to which it is communicatively coupled. A further computer hardware component may then, at a later time, access the memory device to retrieve and process the stored output. Computer hardware components may also initiate communications with input or output devices, and may operate on a resource (e.g., a collection of information).

The various operations of example methods described herein may be performed, at least partially, by one or more processing elements that are temporarily configured (e.g., by software) or permanently configured to perform the relevant operations. Whether temporarily or permanently configured, such processing elements may constitute processing element-implemented modules that operate to perform one or more operations or functions. The modules referred to herein may, in some example embodiments, comprise processing element-implemented modules.

Similarly, the methods or routines described herein may be at least partially processing element-implemented. For example, at least some of the operations of a method may be performed by one or more processing elements or processing element-implemented hardware modules. The performance of certain of the operations may be distributed among the one or more processing elements, not only residing within a single machine, but deployed across a number of machines. In some example embodiments, the processing elements may be located in a single location (e.g., within a home environment, an office environment or as a server farm), while in other embodiments the processing elements may be distributed across a number of locations.

Unless specifically stated otherwise, discussions herein using words such as "processing," "computing," "calculating," "determining," "presenting," "displaying," or the like may refer to actions or processes of a machine (e.g., a computer with a processing element and other computer hardware components) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

Patent claims stemming from this patent application are not intended to be construed under 35 U.S.C. § 112(f) unless traditional means-plus-function language is expressly recited, such as "means for" or "step for" language being explicitly recited in the claim(s).

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A microwire temperature measurement system configured to determine a temperature of a microwire temperature sensor including at least first and second temperature range microwire elements, the microwire temperature measurement system comprising:
   an antenna configured to be positioned near the microwire temperature sensor; and
   a reader configured to transmit an instigation signal to the antenna so that the antenna generates an interrogation signal such that the microwire temperature sensor generates a response signal when the antenna is near the microwire temperature sensor, the instigation signal including a first maximum ramp current amplitude and a second maximum ramp current amplitude greater than the first maximum ramp amplitude so that the response signal includes a first re-magnetization pulse corresponding to the first temperature range microwire element and a second re-magnetization pulse corresponding to the second temperature range microwire element, the first and second re-magnetization pulses being non-overlapping in the time domain.

2. The microwire temperature measurement system of claim 1, the interrogation signal spanning an interrogation period divided into a first portion corresponding to the first maximum ramp current amplitude of the instigation signal and a second portion after the first portion corresponding to the second maximum ramp current amplitude of the instigation signal.

3. The microwire temperature measurement system of claim 1, wherein the reader is configured to select the first maximum ramp current amplitude and the second maximum ramp current amplitude in a calibration mode.

4. The microwire temperature measurement system of claim 1, wherein the microwire temperature measurement system is part of a thermoplastic welding system.

5. The microwire temperature measurement system of claim 3, wherein the reader is configured to, in the calibration mode, iteratively change the first maximum ramp current amplitude and a second maximum ramp current amplitude until a peak-to-peak interval in the time domain of the first re-magnetization pulse and second re-magnetization pulse is optimized.

6. The microwire temperature measurement system of claim 1, the determined microwire sensor temperature being in one of three zones: a first zone at or below a Curie temperature of the first and second temperature range microwire elements, a second zone above the Curie temperature of the first temperature range microwire element and below the Curie temperature of the second temperature range microwire element, and a third zone at or above the Curie temperature of the second temperature range microwire element.

7. The microwire temperature measurement system of claim 1, wherein the microwire temperature sensor further includes a reference microwire element, the response signal including a third re-magnetization pulse corresponding to the reference microwire element, the processor being further configured to normalize the response signal based on the third re-magnetization pulse.

8. The microwire temperature measurement system of claim 1, wherein the instigation signal comprises a ramped alternating current having a triangular waveform and the first and second re-magnetization pulses are voltage pulses.

9. A thermoplastic welding microwire temperature measurement system configured to locate a microwire temperature sensor on a weld line via sensor interrogation, the thermoplastic welding microwire temperature measurement system comprising:
   an antenna configured to be positioned near the microwire temperature sensor;
   a reader configured to transmit an instigation signal to the antenna so that the antenna generates an interrogation signal such that the microwire temperature sensor generates a response signal when the antenna is near the microwire temperature sensor;
   a motorized stage configured to move the antenna along the weld line; and
   a processor configured to determine a position of the microwire temperature sensor based on the response signal.

10. The thermoplastic welding microwire temperature measurement system of claim 9, the processor being further configured to instruct the motorized stage to move the antenna to the position of the microwire temperature sensor during a welding operation to take a temperature measurement via the microwire temperature sensor.

11. The thermoplastic welding microwire temperature measurement system of claim 9, the processor being further configured to determine a center of the microwire temperature sensor based on at least two interrogations of the microwire temperature sensor by the antenna.

12. The thermoplastic welding microwire temperature measurement system of claim 11, wherein the microwire temperature sensor includes a reference element, at least one of the two interrogations eliciting a response signal from the reference element.

13. The thermoplastic welding microwire temperature measurement system of claim 9, wherein the response signal includes a re-magnetization pulse and the processor is further configured to integrate the re-magnetization pulse to determine the position.

14. The thermoplastic welding microwire temperature measurement system of claim 9, wherein the response signal includes a plurality of re-magnetization pulses and the processor is further configured to integrate the plurality of re-magnetization pulses and average the integrals to determine the position.

15. The thermoplastic welding microwire temperature measurement system of claim 14, wherein the processor is further configured to compare the average to a preset minimum threshold value to determine the position.

16. The thermoplastic welding microwire temperature measurement system of claim 9, wherein the response signal includes a plurality of re-magnetization pulses and the processor is further configured to integrate the plurality of re-magnetization pulses, average the integrals, compare the average to a previous average to determine a difference, and compare the difference to a preset minimum threshold value to determine the position.

17. The thermoplastic welding microwire temperature measurement system of claim 9, further comprising:
   an additional antenna spaced from the antenna, the processor being further configured to instruct the motorized stage to advance the antenna past the microwire temperature sensor and move the additional antenna to the position of the microwire temperature sensor during a welding process to take a temperature measurement via the microwire temperature sensor.

* * * * *